(12) United States Patent
Kim et al.

(10) Patent No.: US 10,996,883 B2
(45) Date of Patent: May 4, 2021

(54) STORAGE SYSTEM INCLUDING HOST DEVICE AND STORAGE DEVICE CONFIGURED TO PERFORM SELECTIVE PURGE OPERATION

(71) Applicant: SAMSUNG ELECTRONICS CO., LTD., Suwon-si (KR)

(72) Inventors: Dong-Min Kim, Hwaseong-si (KR); Songho Yoon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 36 days.

(21) Appl. No.: 15/984,446

(22) Filed: May 21, 2018

(65) Prior Publication Data

US 2019/0121570 A1   Apr. 25, 2019

(30) Foreign Application Priority Data

Oct. 24, 2017   (KR) .................... 10-2017-0138568

(51) Int. Cl.
*G06F 3/06* (2006.01)
*G06F 12/10* (2016.01)

(52) U.S. Cl.
CPC ............ *G06F 3/0652* (2013.01); *G06F 3/061* (2013.01); *G06F 3/0604* (2013.01); *G06F 3/0608* (2013.01); *G06F 3/0659* (2013.01); *G06F 3/0679* (2013.01); *G06F 3/0688* (2013.01); *G06F 12/10* (2013.01); *G06F 2212/1044* (2013.01); *G06F 2212/7201* (2013.01)

(58) Field of Classification Search
CPC ..... G06F 2212/1044; G06F 2212/7201; G06F 3/0652; G06F 3/0604; G06F 3/0608; G06F 3/0659; G06F 3/0679; G06F 12/10
See application file for complete search history.

(56) References Cited

U.S. PATENT DOCUMENTS

| | | | |
|---|---|---|---|
| 6,834,329 B2 | 12/2004 | Sasaki et al. | |
| 7,936,603 B2 | 5/2011 | Merry, Jr. et al. | |
| 8,380,948 B2 | 2/2013 | Panther et al. | |
| 9,015,401 B2 | 4/2015 | Hars et al. | |
| 9,286,204 B2 | 3/2016 | Kikkawa et al. | |
| 9,575,977 B1 | 2/2017 | Bergman | |
| 2005/0138232 A1 | 6/2005 | Tamura et al. | |
| 2005/0144357 A1* | 6/2005 | Sinclair ............... | G06F 12/0246 711/103 |

(Continued)

FOREIGN PATENT DOCUMENTS

JP   2004038422 A   2/2004

*Primary Examiner* — Jane Wei
(74) *Attorney, Agent, or Firm* — Volentine, Whitt & Francos, PLLC

(57) ABSTRACT

A storage system includes a host device and a storage device. The host device generates a write command, a logical address of write data corresponding to the write command, and a selective purge tag indicating that the write data are targeted for selective purge. The storage device receives the write command, the logical address, and the selective purge tag, stores write data, and logically erases the stored write data upon receiving an erase command from the host device. In addition, the storage device physically erases the stored write data upon receiving a selective purge request from the host device.

20 Claims, 20 Drawing Sheets

(56) References Cited

U.S. PATENT DOCUMENTS

| | | | |
|---|---|---|---|
| 2006/0195672 A1* | 8/2006 | Inoue | G06F 3/0607 |
| | | | 711/170 |
| 2007/0113029 A1* | 5/2007 | Bennett | G06F 12/0246 |
| | | | 711/159 |
| 2010/0332696 A1* | 12/2010 | Muppirala | G06F 13/1642 |
| | | | 710/39 |
| 2014/0244907 A1* | 8/2014 | Watanabe | G06F 3/0659 |
| | | | 711/103 |
| 2015/0052292 A1 | 2/2015 | Mylly | |
| 2015/0278087 A1* | 10/2015 | Han | G06F 11/3065 |
| | | | 711/103 |
| 2016/0366117 A1 | 12/2016 | McMullen et al. | |
| 2018/0188998 A1* | 7/2018 | Shaharabany | G06F 12/0246 |
| 2018/0225200 A1* | 8/2018 | Seo | G06F 12/0646 |
| 2019/0065085 A1* | 2/2019 | Jean | G06F 3/0679 |

\* cited by examiner

FIG. 7

| 0 | 1 | 2 | 3 |
|---|---|---|---|
| xx00 0001b | Flags | LUN | Task Tag |
| 4 | 5 | 6 | 7 |
| Reserved | Command Set Type | Reserved | Reserved |
| 8 | 9 | 10 (MSB) | 11 (LSB) |
| Total EHS Length(00h) | Reserved | Data Segment Length(0000h) | |
| 12 (MSB) | 13 | 14 | 15 (LSB) |
| Expected Data Transfer Length | | | |
| 16 | | | 31 |
| CDB[0] · · · CDB[15] | | | |
| Header E2ECRC(omit if HD=0) | | | |

FIG. 8

| Bit<br>Byte | 7 | 6 | 5 | 4 | 3 | 2 | 1 | 0 |
|---|---|---|---|---|---|---|---|---|
| 0 | OPERATION CODE(2Ah) | | | | | | | |
| 1 | WPROTECT = 000b | | | DPO | FUA | Reserved | FUA_NV | Obsolete |
| 2 | (MSB) | | | | | | | |
| 3 | LOGICAL BLOCK ADDRESS | | | | | | | |
| 4 | | | | | | | | |
| 5 | | | | | | | | (LSB) |
| 6 | SP | Reserved | | | GROUP NUMBER | | | |
| 7 | (MSB) | | | | | | | |
| 8 | TRANSFER LENGTH | | | | | | | (LSB) |
| 9 | CONTROL = 00h | | | | | | | |

FIG. 13

| 0 | 1 | 2 | 3 |
|---|---|---|---|
| xx01 0110b | Flags | Reserved | Task Tag |
| 4 | 5 | 6 | 7 |
| Reserved | Query Function | Reserved | Reserved |
| 8 | 9 | 10 | 11 |
| Total EHS Length(00h) | Flags | (MSB) Data Segment | Length(0000h) (LSB) |
| 12 | 13 | 14 | 15 |
| | | | |
| | Transaction Specific Fields | | |
| | ... | | |
| 24 | 25 | 26 | 27 |
| | Transaction Specific Fields | | |
| | Header E2ECRC(omit if HD=0) | | |
| k | k+1 | k+2 | k+3 |
| Data[0] | Data[1] | Data[2] | Data[3] |
| ... | ... | ... | ... |
| k+ Length-4 | k+ Length-3 | k+ Length-2 | k+ Length-1 |
| Data[Length-4] | Data[Length-3] | Data[Length-2] | Data[Length-1] |
| Data E2ECRC(omit if DD=0) | | | |

FIG. 14

| | 12 | 13 | 14 | 15 |
|---|---|---|---|---|
| | 06h(SET FLAG) | Flag IDN | INDEX | SELECTOR |
| 16 | 17 | 18 | 19 |
| Reserved | Reserved | Reserved | Reserved |
| 20 | 21 | 22 | 23 |
| Reserved | | | |
| 24 | 25 | 26 | 27 |
| Reserved | | | |

FIG. 18

| Bit Byte | 7 | 6 | 5 | 4 | 3 | 2 | 1 | 0 |
|---|---|---|---|---|---|---|---|---|
| 0 | OPERATION CODE(2Ah) ||||||||
| 1 | WPROTECT = 000b ||| DPO | FUA | Reserved | FUA_NV | Obsolete |
| 2 | (MSB) |||||||  |
| 3 | LOGICAL BLOCK ADDRESS ||||||||
| 4 |  |||||||  |
| 5 |  |||||||| (LSB) |
| 6 | SP || SPG ID || GROUP NUMBER ||||
| 7 | (MSB) |||||||  |
| 8 | TRANSFER LENGTH |||||||| (LSB) |
| 9 | CONTROL = 00h ||||||||

FIG. 19

| | 12 | 13 | 14 | 15 |
|---|---|---|---|---|
| | 06h(SET FLAG) | Flag IDN | INDEX | SELECTOR |
| | 16 | 17 | 18 | 19 |
| | SPG ID | Reserved | Reserved | Reserved |
| | 20 | | 21 | 22 | 23 |
| | Reserved | | | | |
| | 24 | | 25 | 26 | 27 |
| | Reserved | | | | |

STORAGE SYSTEM INCLUDING HOST DEVICE AND STORAGE DEVICE CONFIGURED TO PERFORM SELECTIVE PURGE OPERATION

CROSS-REFERENCE TO RELATED APPLICATIONS

This U.S. non-provisional patent application claims the benefit of priority under 35 U.S.C. § 119 to Korean Patent Application No. 10-2017-0138568, filed on Oct. 24, 2017 in the Korean Intellectual Property Office, the disclosures of which are incorporated by reference herein in their entireties.

BACKGROUND

1. Technical Field

The present disclosure relates to a semiconductor memory. More particularly, the present disclosure relates to a storage device configured to perform a purge operation selectively and a storage system including the storage device.

2. Description of the Related Art

In recent years, electronic devices such as a smartphone, a desktop computer, a laptop computer, a tablet personal computer (PC), and a wearable device have been made widely available and are widely used. Each of these electronic devices includes a storage device to store data, and such electronic devices have trended towards higher storage capacities and higher processing (and communication) speeds. In particular, much effort has been made to increase storage capacities and improve speeds of the storage devices. As an example, multiple different protocols have been proposed and adopted for interfaces between host devices and the storage devices of the electronic device.

A storage device included in the electronic device may include a nonvolatile memory device, which retains data stored therein even when power is interrupted. Examples of nonvolatile memory devices include a flash memory, a phase-change random access memory (RAM), a resistive RAM (PRAM), a ferroelectric RAM (FRAM), and the like. However, the above-described nonvolatile memory devices are non-overwritable and may use a purge operation to erase existing data physically for the purpose of storing new data. For example, the purge operation may be performed due to, for example, insufficiency of a storage space or security reasons.

However, since a general purge scheme causes physical erasing with respect to all invalid data stored in the storage devices, a speed of the storage devices may decrease. Therefore, there is a need to develop purge schemes capable of improving the speed of the storage devices while satisfying a variety of recently proposed protocols for interfaces between the host devices and the storage devices.

SUMMARY

Embodiments of the present disclosure provide a selective purge scheme for preventing an operating speed of a storage device from decreasing upon performing a purge operation on the storage device.

According to an exemplary embodiment, a storage system includes a host device and a storage device. The host device is configured to generate a write command, a logical address of write data corresponding to the write command, and a selective purge tag indicating that the write data are targeted for selective purge. The storage device is configured to receive the write command, the logical address, and the selective purge tag, to store write data, and to logically erase the stored write data upon receiving an erase command from the host device. The storage device may be configured to physically erase the stored write data upon receiving a selective purge request from the host device.

According to an exemplary embodiment, an operating method of a storage system includes receiving a first packet which is based on a write command, a logical address of write data corresponding to the write command, and a selective purge tag indicating that the write data are targeted for selective purge. The operating method also includes receiving a second packet which is based on the write data. The first packet and the second packet are generated by a host device. The operating method also includes parsing the first packet to manage the logical address in a selective purge group, storing the write data from the second packet, logically erasing the stored write data from a storage device based on an erase command received from the host device, and physically erasing the stored write data from the storage device based on a third packet that depends on a selective purge request from the host device.

According to an exemplary embodiment, a storage system includes a host device, and a storage device. The host device is configured to generate a command Universal Flash Storage (UFS) protocol information unit (UPIU) including a write command and a selective purge tag indicating that write data corresponding to the write command are targeted for selective purge, and data UPIU including the write data. The storage device is configured to receive the command UPIU and the data UPIU, to manage the write data in a selective purge group, and to logically erase the write data upon receiving an unmap UPIU from the host device. The host device may be configured to further generate a query request UPIU including a selective purge request for physically erasing the write data belonging to the selective purge group. The storage device may be configured to receive the query request UPIU and physically erase the write data belonging to the selective purge group based on the selective purge request.

BRIEF DESCRIPTION OF THE FIGURES

The above and other objects and features of the present disclosure will become apparent by describing in detail exemplary embodiments thereof with reference to the accompanying drawings.

FIGS. 7 and 8 are views illustrating a format of a packet output by a host device, according to an embodiment of the present disclosure.

FIGS. 13 and 14 are views illustrating a format of a packet output by the host device, according to an embodiment of the present disclosure.

FIGS. 18 and 19 are views illustrating a format of a packet output by the host device, according to an embodiment of the present disclosure.

DETAILED DESCRIPTION

Below, embodiments of the present disclosure may be described in detail and clearly to such an extent that one of ordinary skill in the art easily implements the inventive concepts described herein.

Figure 1:
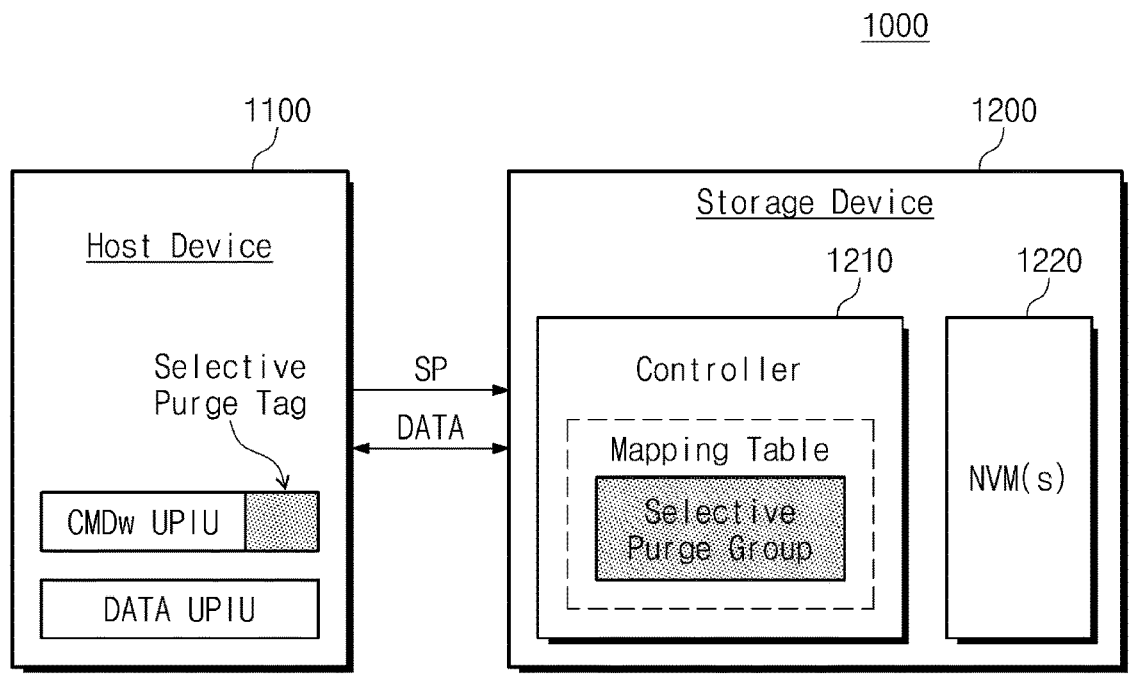
FIG. 1 is a block diagram illustrating a storage system configured to perform a purge operation selectively, according to an embodiment of the present disclosure.

FIG. 1 is a block diagram illustrating a storage system 1000 configured to perform a purge operation selectively, according to an embodiment of the present disclosure. The storage system 1000 in FIG. 1 includes a host device 1100 and a storage device 1200. Below, in the specification, a purge operation refers to physically erasing all invalid data stored in the storage device 1200, and a selective purge operation refers to physically erasing a part of invalid data stored in the storage device 1200. That is, a selective purge operation refers to selectively physically erasing invalid data that may be less than all invalid data stored in the storage device 1200. Physical erasing data as described herein may be taken to mean actually erasing data, such as by applying a charge higher than the existing charge(s) in the memory cells. Logically erasing data as described herein may be taken to mean something other than actually erasing the data in memory cells, such as by un-correlating a previously correlated logical address and a physical address of the memory cells.

Moreover, the term "invalid data" as used herein may refer to data that has been identified as being physically and/or logically erasable for any reason, such as that it is old and unused, designated for erasing by a user, of a low priority, corrupted or suspected of being corrupted, and so on. Accordingly, invalid data may be data in memory cells at physical addresses and/or logical addresses designated for physical erasing and/or logical erasing The host device 1100 may manage and process overall operations of the storage system 1000. The host device 1100 may perform various arithmetic operations/logical operations. For example, the host device 1100 may include one or more processor cores. The host device 1100 may be implemented to include dedicated circuits (e.g., field programmable gate arrays (FPGA) and application specific integrated circuits (ASICs)) or may be implemented with a system on chip (SoC). For example, the host device 1100 may include a general-purpose processor, a special-purpose processor, or an application processor. The host device 1100 may be a processor itself or an electronic device or a system including a processor.

The host device 1100 may generate a command and write data corresponding to a write request for the storage device 1200. In addition, the host device 1100 may generate an unmap command corresponding to an erase request, a purge request, and the like. For example, the write command, the write data, the unmap command, the purge request, and the like may be converted/processed to packets (e.g., CMDw UPIU and DATA UPIU) including a command Universal Flash Storage (UFS) protocol information unit (UPIU) for (in compliance with) an interface protocol proposed by the JEDEC.

Before proceeding, the unmap command mentioned above is explained in the context of a physical address and a logical address. A physical address is a memory address that may be part of a comprehensive address scheme for all memory addresses of an integrated system, and/or a permanent address for the memory address. On the other hand, a logical address is a memory address of convenience, such as to logically organize a set of potentially unrelated physical memory addresses. For example, logical memory addresses may be assigned to a set of physical memory addresses that are not adjacent and which have intervening physical memory addresses. Logical memory addresses may be assigned for storage of a set of data for which a block of adjacent physical memory addresses is not available as a cohesive storage unit. When logical memory addresses are assigned, the relationship between the logical memory addresses and the corresponding physical memory addresses may be stored. An unmap command may be used to eliminate the relationship/correspondence between physical memory addresses and logical memory addresses.

When generating the write command, the host device 1100 may generate a tag indicating that write data to be transferred are targeted for selective purge. Write data to be stored in the storage device 1200 and logical/physical addresses associated therewith may be separately managed as a selective purge group. If a selective purge request is provided to the storage device 1200, a purge operation may be performed only on invalid data managed in the selective purge group, and not all invalid data of the storage device 1200.

The storage device 1200 may include a controller 1210 and nonvolatile memory devices 1220, represented by a singular nonvolatile memory device in FIG. 1, but which may be one or more than one nonvolatile memory devices in different embodiments. The controller 1210 may manage a mapping table to define a correspondence relationship between logical addresses and physical addresses of data stored (or to be stored) in the nonvolatile memory devices

1220. In addition, the controller 1210 may manage invalid data managed in the selective purge group. The controller 1210 may physically erase invalid data belonging to the selective purge group in response to a selective purge request from the host device 1100.

According to the above-described configuration, in the case where a storage space of the storage device 1200 is insufficient, after an unmap operation that is a logical erase operation is performed, the purge operation may be selectively performed on unmapped data to selectively physically erase the unmapped data. That is, not all invalid data are physically erased, but only invalid data belonging to the selective purge group are physically erased. Therefore, the operating performance of the storage system 1000 may be improved.

Figure 2:
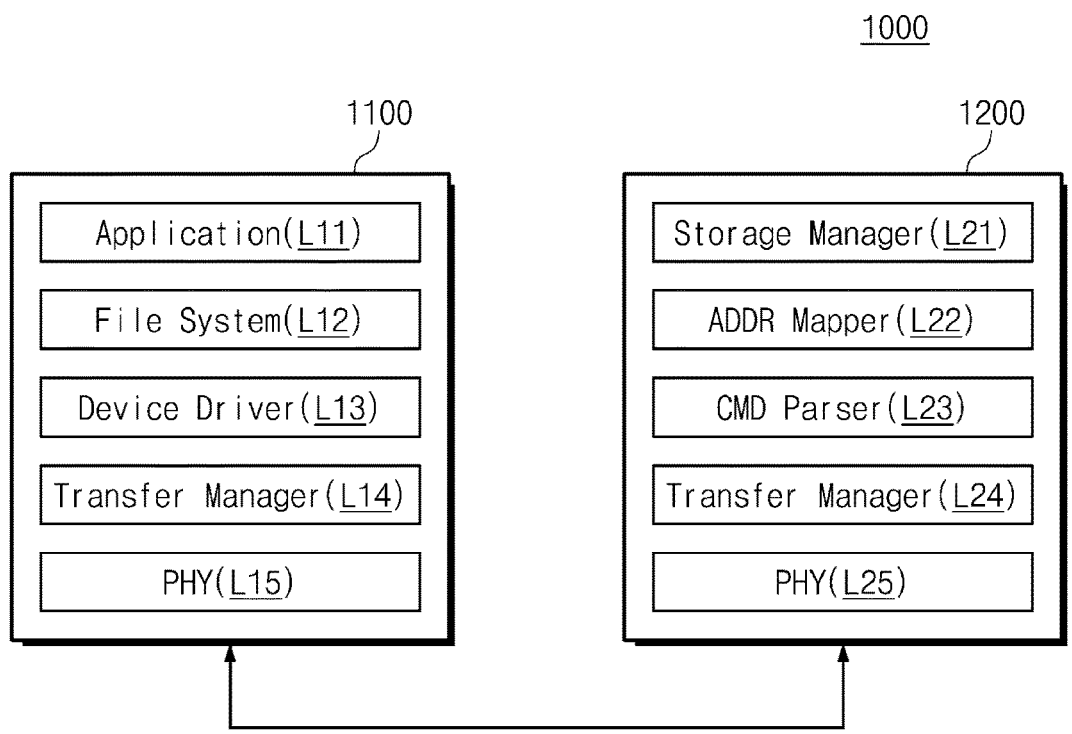
FIG. 2 is a block diagram illustrating a layer structure for an exemplary interface protocol adoptable in the storage system of FIG. 1.

FIG. 2 is a block diagram illustrating a layer structure for (in compliance with) an exemplary interface protocol adoptable in the storage system 1000 of FIG. 1. For example, the host device 1100 and the storage device 1200 may be implemented according to the Universal Flash Storage (UFS) protocol proposed by the JEDEC for the purpose of communicating with each other.

The host device 1100 may include an application/HCI (Host Controller Interface) layer L11 (hereinafter referred to as an "application layer"), a file system L12, a device driver L13, a transfer manager L14, and a PHY layer L15. Each of the layers L11, L12, L13, L14, and L15 of the host device 1100 may include a program code executable by a physical hardware circuit and/or a processor for the purpose of performing a unique function(s).

The storage device 1200 may include a storage manager L21, an address mapper L22, a command parser L23, a transfer manager L24, and a PHY layer L25. Each of the layers L21, L22, L23, L24, and L25 of the storage device 1200 may include a program code executable by a physical hardware circuit and/or a processor core for the purpose of performing a unique function(s).

The application layer L11 that is an upper layer may handle a request from a user of the storage system 1000. The application layer L11 may handle normal commands for a read operation and a write operation. The application layer L11 may provide a control of a device level such as a query request. In addition, the application layer L11 may handle a control of a device level such as device sleep, device power down, and device power management.

The file system L12 may organize data (files) to be stored in the storage device 1200. The file system L12 may generate a logical address corresponding to an access request (e.g., a write request or the like) associated with (for) the storage device 1200. In an embodiment, the file system L12 may include a FAT (File Allocation Table), a FAT32, NTFS (NT File System), HFS (Hierarchical File System), JSF2 (Journaled File System2), XFS, ODS-5 (On-Disk Structure-5), UDF, ZFS, UFS (Unix File System), ext2, ext3, ext4, ReiserFS, Reiser4, ISO 9660, Gnome VFS, BFS, WinFS, and the like.

The device driver L13 may also be referred to herein as a device manager and may control a device and/or a layer (e.g., the transfer manager L14) included in the host device 1100. The device driver L13 may convert a request (e.g., a write request or the like) for the storage device 1200 generated by the file system L12 to a command capable of being identified by the storage device 1200. For example, the file system L12 and the device driver L13 may be included in an operating system (OS), and the application layer L11 may be installed in the OS.

Each of the transfer manager L14 and transfer manager L24 may generate a packet including an UPIU for (in compliance with) the interface protocol proposed by the JEDEC. Each of the transfer manager L14 and transfer manager L24 may include a transport layer, a network layer, a data link layer, and a PHY adapter layer. The transport layer may detect and recover an error of data. The network layer may manage a communication path or may handle a communication timing. The data link layer may manage physical transmission and composition of data. The PHY adapter layers may manage communication environments of the PHY layer L15 and PHY layer L25, respectively. For example, for the respective PHY layers, the PHY adapter layers may process data symbols or may control power.

Accordingly, the transfer manager L14 and transfer manager L24, each of which includes the transport layer, the network layer, the data link layer, and the PHY adapter layer, may transfer and convert a packet exchanged through the PHY layer L15 and PHY layer L25. For example, the transport layer, the network layer, the data link layer, and the PHY adapter layer that are link layers may be implemented in compliance with the protocol proposed by the JEDEC.

Each of the PHY layer L15 and PHY layer L25 may include a communication circuit (e.g., a transmitter/receiver, a modulator/de-modulator, an encoder/decoder, and an oscillator) to send and receive a packet. The PHY layer L15 of the host device 1100 may exchange packets with the PHY layer L25 of the storage device 1200. For example, the PHY layer L15 and PHY layer L25, each of which is a physical layer, may be implemented in compliance with the PHY protocol proposed by the MIN alliance.

The command parser L23 may parse a command included in a packet including various types of UPIUs received from the host device 1100. For example, a write operation, an unmap operation, a purge operation, or the like may be performed on the basis of a result of parsing a packet including the UPIU at the command parser L23.

The address mapper L22 may allow a logical address generated by the host device 1100 to correspond to a physical address of a space (e.g., the storage device 1200 of FIG. 1) in which data are stored (or to be stored). For example, the address mapper L22 may be a flash translation layer (FTL) to translate a logical address generated by the file system L12 to a physical address of the storage device 1200.

The storage manager L21 may perform functions of a device level. For example, the storage manager L21 may manage data stored in the storage device 1200 or may manage power of the storage device 1200.

In embodiments to be described below, it may be assumed that the storage system 1000 adopts the Universal Flash Storage (UFS) protocol. However, the assumption is provided for better understanding, and embodiments of the present disclosure may not be limited thereto. The one of ordinary skill in the art may apply embodiments of the present disclosure to other interface protocols in addition to the Universal Flash Storage (UFS) protocol, based on the following descriptions.

Figure 3:
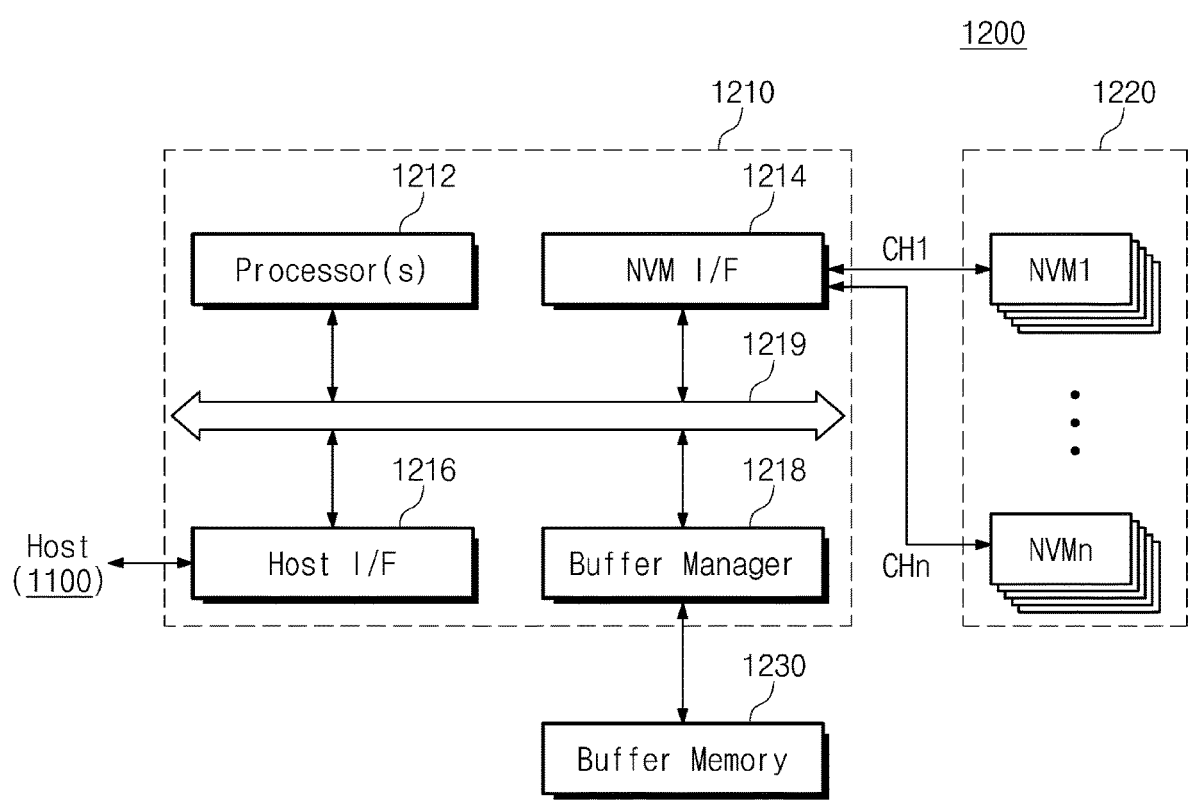
FIG. 3 is a block diagram illustrating a configuration of a storage device of the storage system illustrated in FIG. 1.

FIG. 3 is a block diagram illustrating a configuration of the storage device 1200 of the storage system 1000 illustrated in FIG. 1. Unlike FIG. 2 in which layers are hierarchically illustrated, FIG. 3 illustrates multiple blocks that are classified according to functions/operations of the storage device 1200. For better understanding, a description of FIG. 3 will be given together with reference to features of FIG. 2.

The storage device 1200 may include the controller 1210, multiple nonvolatile memory devices 1220, and a buffer memory 1230. The controller 1210 may include a processor 1212, which is representative of one or more processors. In addition, the controller 1210 may further include a memory interface 1214, a host interface 1216, and a buffer memory 1230. The memory interface 1214 may perform interfacing with the nonvolatile memory devices 1220. The host interface 1216 may perform interfacing with the host device 1100 in compliance with the unit file system (UFS) protocol. The buffer manager 1218 may manage the buffer memory 1230.

The processor 1212 may control overall operations of the controller 1210. The processor 1212 may drive various types of firmware/software needed to drive the controller 1210 or to control the nonvolatile memory devices 1220. For example, the processor 1212 may drive the command parser L23 to parse a command included in a packet that includes the UPIU and is received from the host device 1100 or may operate as the command parser L23. Alternatively or additionally, the processor 1212 may drive the address mapper L22 for managing a mapping table.

The nonvolatile memory devices 1220 may include memory areas for storing data. For example, in the case where the nonvolatile memory devices include NAND flash memories, each of the nonvolatile memory devices 1220 may include an array of memory cells formed along multiple word lines and multiple bit lines.

However, the above example may not limit the teachings of the present disclosure. The nonvolatile memory devices 1220 may include one or more of various nonvolatile memory devices such as an electrically erasable and programmable ROM (EEPROM), a NOR flash memory, a phase-change RAM (PRAM), a resistive RAM (ReRAM), a ferroelectric RAM (FRAM), a spin-torque magnetic RAM (STT-MRAM), and the like. For better understanding, in the following description, it may be assumed that the nonvolatile memory devices include NAND flash memories. However, configurations of the nonvolatile memory devices 1220 may be variously changed or modified.

The buffer memory 1230 may store data to be used for an operation of the storage device 1200. The buffer memory 1230 may temporarily store data processed or to be processed by the processor 1212. For example, the buffer memory 1230 may temporarily store a packet that includes UPIU and is received from the host device 1100. For example, a mapping table needed to manage the address mapper L22 may be loaded onto the buffer memory 1230. For example, the buffer memory 1230 may include a volatile memory, such as a dynamic random-access memory (DRAM) a synchronous DRAM (SDRAM), or the like, and/or a nonvolatile memory, such as a PRAM, a magneto-resistive RAM (MRAM), an ReRAM, an FRAM, or the like.

Figure 4:
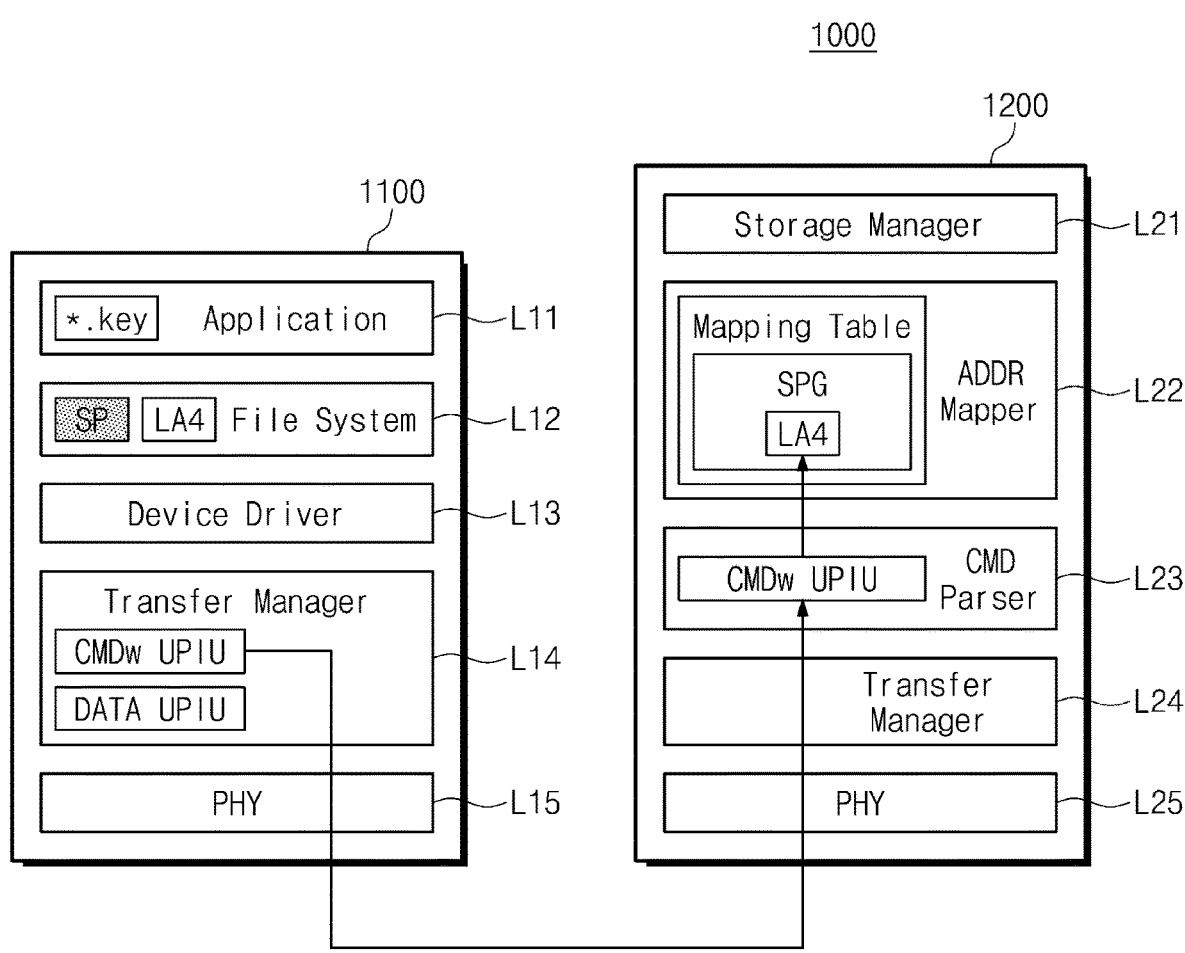
FIG. 4 is a block diagram hierarchically illustrating a process in which a file is generated upon performing a selective purge operation, according to an embodiment of the present disclosure.

FIG. 4 is a block diagram hierarchically illustrating a process in which a file is generated upon performing a selective purge operation, according to an embodiment of the present disclosure. For better understanding, a description of FIG. 4 will be given together with reference to features of FIG. 3.

The application layer L11 may generate one or more files in response to a request of a user. Files having various extensions may be generated according to the user request. However, in an embodiment, it is assumed that a file (hereinafter referred to as a "key file") having the extension "key" is generated. For example, the key file may include information needed to encrypt a file to be stored in the storage device 1200.

The file system L12 may generate a logical address LA4 corresponding to the key file. The logical address LA4 may be translated to a physical address by the address mapper L22, and the translated physical address may indicate a space in which the key file will be stored, of the nonvolatile memory devices 1220 of the storage device 1200.

The file system L12 may check a type (i.e., the extension) of the key file that is generated according to a write request associated with the storage device 1200. The file system L12 may determine whether there is a need to perform a selective purge operation on the generated key file in consideration of a type of an application, a type of a file, and the like. If it is determined that there is a need to physically delete the key file through the selective purge operation, the file system L12 may generate a selective purge tag SP.

The transfer manager L14 may generate the UPIU under control of the device driver L13 driven on an operating system (OS). For example, the transfer manager L14 may generate a write command UPIU CMDw UPIU based on the write request of the user, the logical address LA4, and the selective purge tag SP. The transfer manager L14 may generate data UPIU DATA UPIU based on the key file. The generated UPIUs CMDw UPIU and DATA UPIU may be provided to the storage device 1200 through the PHY layer L15 and PHY layer L25.

The command parser L23 may parse a command included in the write command UPIU CMDw UPIU. For example, the command parser L23 may parse a type of a command (e.g., a write command), and may parse whether the write command UPIU CMDw UPIU includes the selective purge tag SP. When the command parser L23 parses that the write command UPIU CMDw UPIU includes the selective purge tag SP, this will be taken to mean that the data UPIU DATA UPIU received from the host device 1100 includes write data to be physically erased by the selective purge operation later.

The address mapper L22 may translate the logical address LA4 to a physical address. In addition, the address mapper L22 may manage the logical address LA4 in a separate selective purge group SPG. Physical addresses corresponding to logical addresses managed in the selective purge group SPG indicate a memory space that stores invalid data to be erased selectively and physically.

Figure 5:
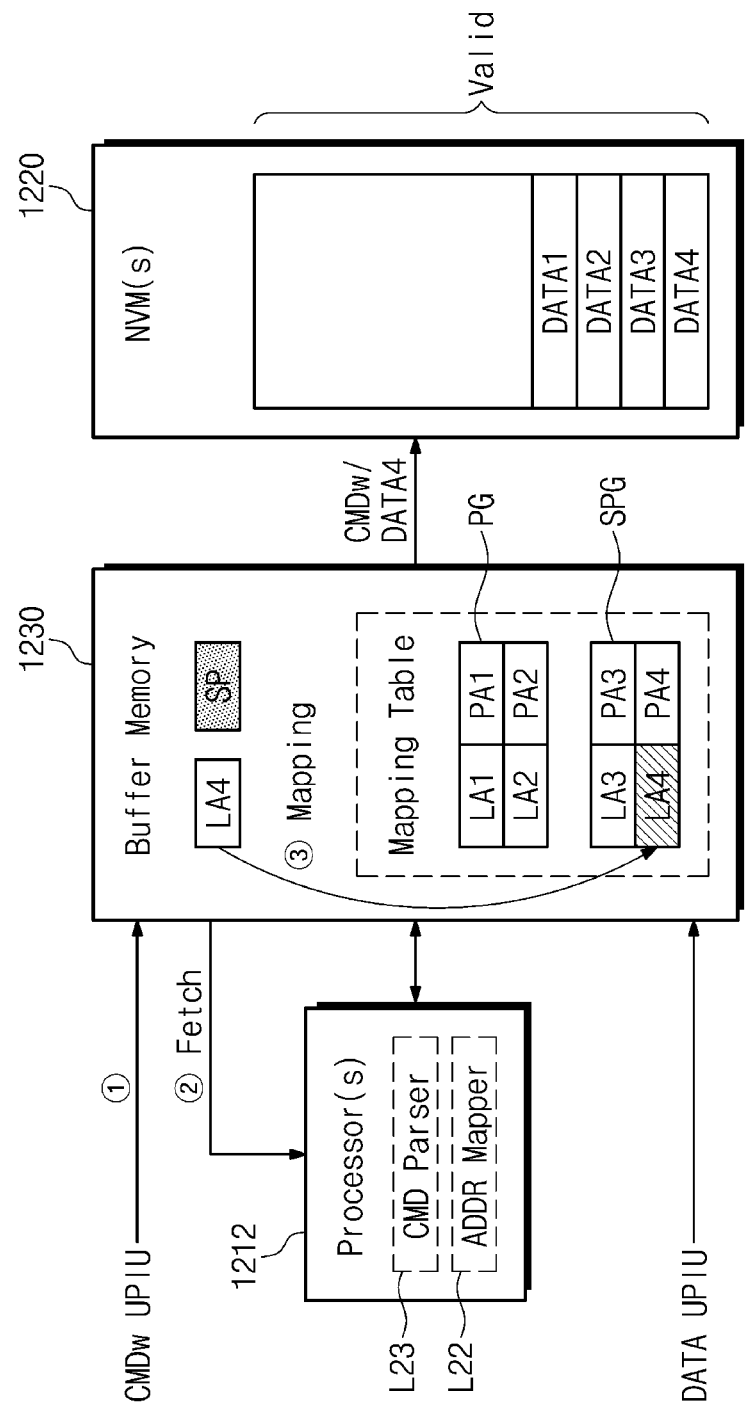
FIGS. 5 and 6 are block diagrams illustrating a configuration of the storage device of the storage system illustrated in FIG. 4.
Figure 6:
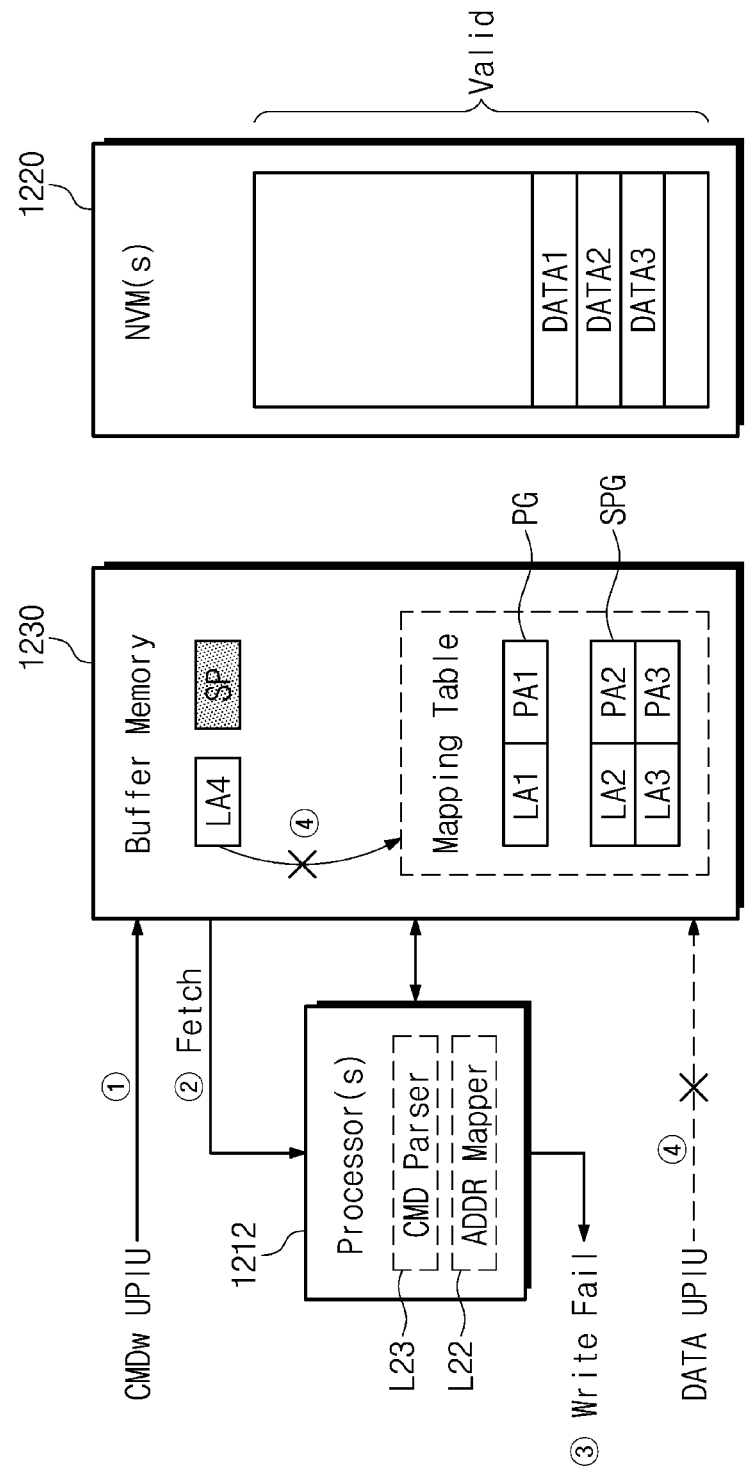

FIGS. 5 and 6 are block diagrams illustrating a configuration of the storage device 1200 of the storage system 1000 illustrated in FIG. 4. Unlike FIG. 4 in which layers are hierarchically illustrated, FIGS. 5 and 6 illustrate multiple blocks that are classified according to functions/operations of the storage device 1200. For better understanding, a description of FIGS. 5 and 6 will be given together with reference to combined features of FIGS. 3 and 4.

FIGS. 5 and 6 illustrate that logical addresses LA1 and LA2 and/or physical addresses PA1 and PA2 corresponding thereto are already managed in a purge group PG and that a logical address LA3 and/or a physical address PA3 corresponding thereto are already managed in the selective purge group SPG. In addition, pieces of data DATA1, DATA2, and DATA3 may be indicated by the physical addresses PA1, PA2, and PA3, respectively.

Referring to FIG. 5, the write command UPIU CMDw UPIU received from the host device 1100 may be stored in the buffer memory 1230 (operation ①). The processor 1212 may fetch the write command UPIU CMDw UPIU stored in the buffer memory 1230 (operation ②).

As the processor 1212 directly parses the write command UPIU CMDw UPIU or the command parser L23 driven by the processor 1212 parses the write command UPIU CMDw UPIU, the received command may be recognized as a command corresponding to a write request. In addition, when the selective purge tag SP is received together with the write command UPIU CMDw UPIU, it may be recognized that the data UPIU DATA UPIU received following the write command UPIU CMDw UPIU includes data to be erased physically by the selective purge operation.

The address mapper L22 driven by the processor 1212 may translate the logical address LA4 to a physical address PA4. In addition, the address mapper L22 may manage the logical address LA4 and/or the physical address PA4 in the selective purge group SPG (operation ③). The purge group PG and the selective purge group SPG are illustrated as being separately managed. However, the selective purge group SPG may be managed as a part of the purge group PG.

Afterwards, the data UPIU DATA UPIU may be received and may be processed to have a format suitable for the nonvolatile memory devices 1220. A write data CMDw and the processed write data DATA4 may be provided to the nonvolatile memory devices 1220, and the write data DATA4 may be stored in a space indicated by the physical address PA4.

Moreover, according to a scheme associated with a selective purge operation described in the specification, the data UPIU DATA UPIU received from the host device 1100 may be inappropriate in terms of an allocated resource. For example, in the case where the size of the received data UPIU DATA UPIU exceeds an allocated resource (e.g., the size or capacity of a selective purge group), it is impossible to manage the selective purge group. An example of processing such a case is illustrated in FIG. 6.

Referring to FIG. 6, if the write command UPIU CMDw UPIU is received (operation ①), the processor 1212 or the command parser L23 driven by the processor 1212 may fetch and parse the write command UPIU CMDw UPIU (operation ②). If information (included in the write command UPIU CMDw UPIU) about the size of the data UPIU DATA UPIU to be received exceeds an allocated resource (e.g., the size or capacity of a selective purge group), the processor 1212 may process a write request from the host device 1100 as write fail (operation ③). If the write fail occurs, the logical address LA4 may not be translated to a physical address and may not be managed in the selective purge group SPG. Of course, the data UPIU DATA UPIU corresponding to the write command UPIU CMDw UPIU may not be received (operation ④), or may be received and discarded FIGS. 7 and 8 are views illustrating a format of a packet that the host device 1100 outputs, according to an embodiment of the present disclosure. For example, a packet that the host device 1100 outputs may include a Universal Flash Storage (UFS) protocol information unit (UPIU) for (in compliance with) the interface protocol proposed by the JEDEC.

Referring to FIG. 7, the host device 1100 may output a command UPIU. The command UPIU may include multiple fields. Each field of the command UPIU may be referenced by using a number marked in the drawing. Each field of the command UPIU may include data of one byte.

A 0th field of the command UPIU may include information about a transaction type. For example, a transaction code allocated to the command UPIU may be "000001b".

A 1st field of the command UPIU may include information about a flag. The first field of the command UPIU may include a flag indicating that a data read operation is required from the host device 1100, a flag indicating that a data write operation is required from the host device 1100, and the like.

A 2nd field of the command UPIU may include information about a logical unit number LUN of the storage device 1200.

A 3rd field of the command UPIU may include information about a task tag.

A part (e.g., 4 bits) of a 4th field of the command UPIU may include information about a command set type. For example, the command set type may include a small computer system interface (SCSI) command set, a Universal Flash Storage (UFS) specific command set, a vendor specific command set, and the like.

An 8th field of the command UPIU may include information about the overall length of an extra header segment (EHS).

In the command UPIU, 10th and 11th fields may include information about the number of valid bytes of a data segment.

In the command UPIU, 12th to 15th fields may include information about an expected data transfer length.

In the command UPIU, 16th to 31st fields may be allocated to a write command descriptor block. This will be described with reference to FIG. 8.

An end-to-end cyclic redundancy check (CRC) code (Header E2ECRC) of a header may be optionally added following the 31st field of the command UPIU. For example, in the case where a first bit of the 0th field is "0", the end-to-end CRC code may be omitted.

Referring to FIG. 8, the write command descriptor block may include multiple fields. Each field of the write command descriptor block may be referenced by using a number marked in the drawing.

A write protection field WPROTECT may be set to "0" in a system to which the Universal Flash Storage (UFS) protocol is applied.

A disable page out (DPO) field may include information associated with a retention priority. For example, in the case where the disable page out field is set to "0", the retention priority may be determined by a retention priority field value that is present in a caching mode page. For example, in the case where the disable page out field is set to "1", the storage device 1200 (refer to FIG. 5) may allocate the lowest retention priority to logical blocks accessed by a command.

A force unit access (FUA) may include information about logical blocks recorded in a storage medium. For example, in the case where the force unit access is set to "0", the storage device 1200 may record logical blocks in a cache and/or a storage medium. For example, in the case where the force unit access is set to "1", the storage device 1200 may record logical blocks in a storage medium and may not complete a command to a GOOD state before all logical blocks are recorded in the storage medium without errors.

FUA_NV may be defined in units of SCSI block commands. However, a value of FUA_NV may not be considered in a system to which the Universal Flash Storage (UFS) protocol is applied.

A logical block address indicates a logical address of a block.

The selective purge tag SP may include information about whether write data to be transferred to the storage device 1200 are targeted for a selective purge operation. For example, in the case where a value of the selective purge tag SP is set to "0", write data to be stored in the storage device 1200 may be targeted for a normal purge operation. That is, all invalid data of the storage device 1200 may be erased physically upon performing the purge operation.

In contrast, in the case where a value of the selective purge tag SP is set to "1", write data transferred together with the command UPIU may be managed in a separate selective purge group. Afterwards, write data may be logically deleted (i.e. or e.g., unmapped) according to an erase request from the host device 1100. In the case where there is a need to erase write data physically because of, for example, insufficiency of storage space or security reasons, data managed in the selective purge group may be physically erased according to a selective purge request from the host device 1100.

A group number may include information about system data characteristics or a connected context ID ContextID.

A transfer length may indicate the number of consecutive logical blocks of data transferred to the storage device 1200 for recording.

Figure 9:
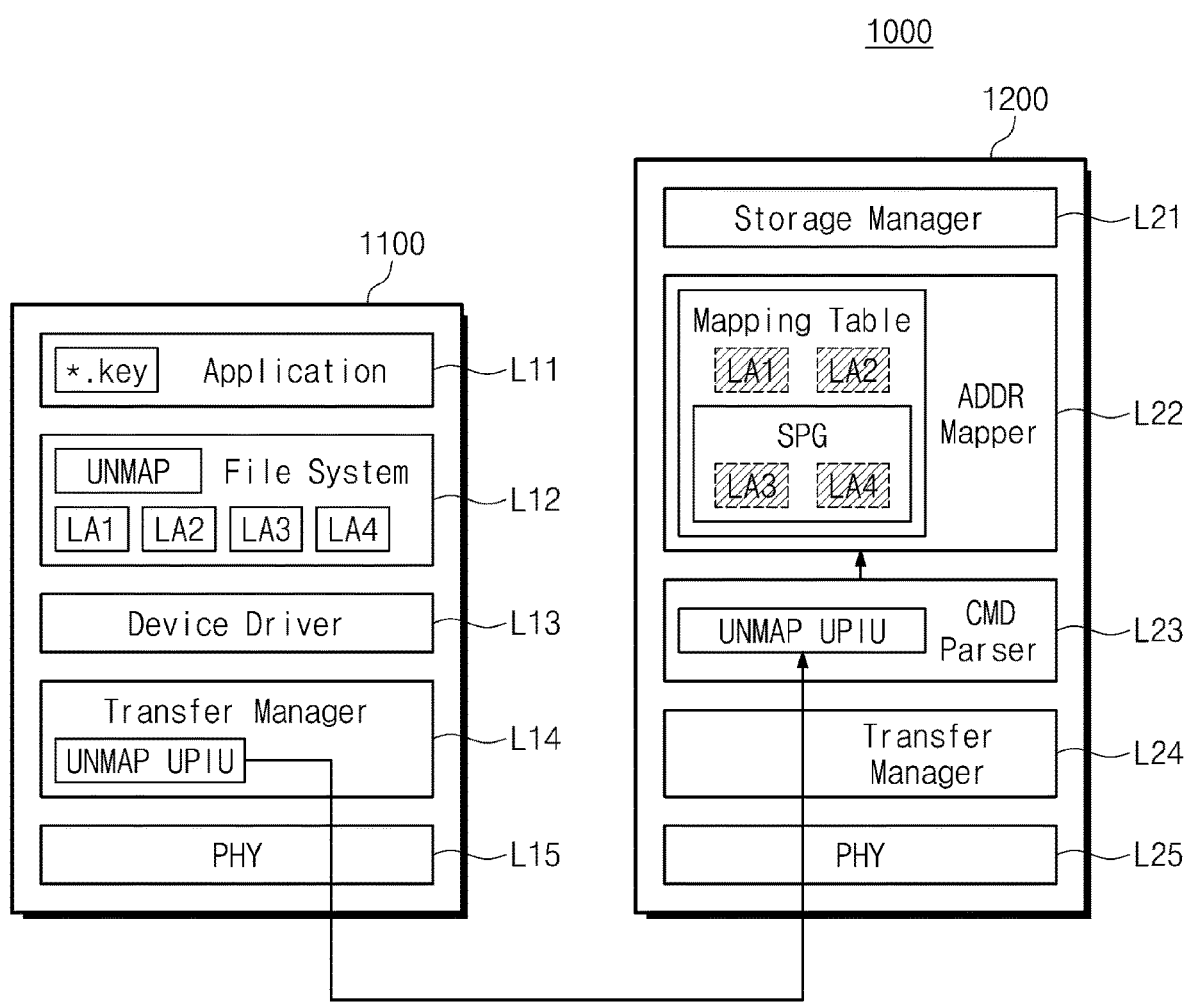
FIG. 9 is a block diagram hierarchically illustrating a process in which an erase operation is performed upon performing a selective purge operation, according to an embodiment of the present disclosure.

FIG. 9 is a block diagram hierarchically illustrating a process in which an erase operation is performed upon performing a selective purge operation, according to an embodiment of the present disclosure. For better understanding, a description of FIG. 9 will be given together with reference to features of FIG. 3.

As a user requests deletion of files, the file system L12 may generate an unmap command and logical addresses LA1, LA2, LA3, and LA4 of files to be deleted. The transfer manager L14 may generate an unmap UPIU under control of the device driver L13. The unmap UPIU may be transferred to the storage device 1200 through the PHY layer L15 and PHY layer L25. The command parser L23 may parse the unmap UPIU to check that an unmap request, for the storage device 1200, according to an erase command is received.

The address mapper L22 may unmap the logical addresses LA1, LA2, LA3, and LA4 from a mapping table. For example, the address mapper L22 may release a correspondence relationship between the logical addresses LA1, LA2, LA3, and LA4 and physical addresses corresponding thereto. As such, data that correspond to the logical addresses LA1, LA2, LA3, and LA4 and are stored in the storage device 1200 may be set to invalid data. However, even though the logical addresses LA1, LA2, LA3, and LA4 are unmapped by the address mapper L22, the logical addresses LA3 and LA4 belonging to the selective purge group and physical addresses corresponding thereto may be managed separately from logical addresses LA1 and LA2 not belonging to the selective purge group.

Figure 10:
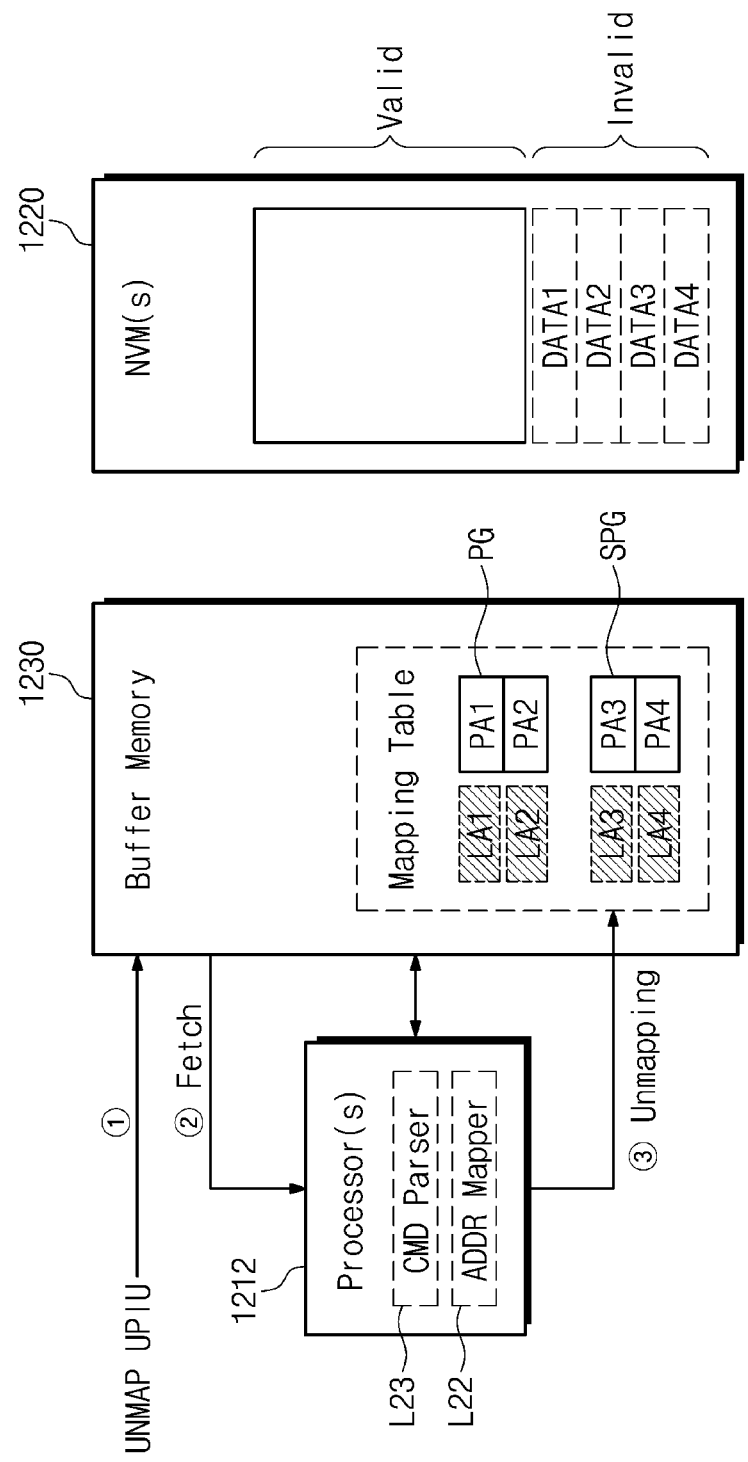
FIG. 10 is a block diagram illustrating a configuration of the storage device of the storage system illustrated in FIG. 9.

FIG. 10 is a block diagram illustrating a configuration of the storage device 1200 of the storage system 1000 illustrated in FIG. 9. Unlike FIG. 9 in which layers are hierarchically illustrated, FIG. 10 illustrates multiple blocks that are classified according to functions/operations of the storage device 1200. For better understanding, a description of FIG. 10 will be given together with reference to features of FIG. 9.

FIG. 10 illustrates that logical addresses LA1 and LA2 and/or physical addresses PA1 and PA2 corresponding thereto are managed in the purge group PG and that logical addresses LA3 and LA4 and/or physical addresses PA3 and PA4 corresponding thereto are managed in the selective purge group SPG. In addition, pieces of data DATA1, DATA2, DATA3, and DATA4 may be indicated by the physical addresses PA1, PA2, PA3, and PA4, respectively.

The unmap UPIU received from the host device 1100 may be stored in the buffer memory 1230 (operation ①). The processor 1212 may fetch the unmap UPIU stored in the buffer memory 1230 (operation ②).

As the processor 1212 directly parses the unmap UPIU or the command parser L23 driven by the processor 1212 parses the unmap UPIU, the received command may be recognized as a command corresponding to an erase request.

The address mapper L22 driven by the processor 1212 may unmap the logical addresses LA1, LA2, LA3, and LA4 from a mapping table (operation ③). The purge group PG and the selective purge group SPG are illustrated as being separately managed. However, the selective purge group SPG may be managed as a part of the purge group PG. Through the unmapping operation, the pieces of data DATA1, DATA2, DATA3, and DATA4 indicated by the physical addresses PA1, PA2, PA3, and PA4 corresponding to the logical addresses LA1, LA2, LA3, and LA4 may be set to invalid data.

However, unlike the logical addresses LA1 and LA2 and/or the physical addresses PA1 and PA2 targeted for a normal purge operation, the logical addresses LA3 and LA4 and/or the physical addresses PA3 and PA4 targeted for a selective purge operation may be still managed in a separate group by the address mapper L22. Therefore, in the case where there is a need to physically erase data to be stored in the storage device 1200 due to, for example, insufficiency of a storage space or security reasons, the pieces of data DATA3 and DATA4 that correspond to the logical addresses LA3 and LA4 and/or the physical addresses PA3 and PA4 belonging to the selective purge group may be erased selectively and physically.

Figure 11:
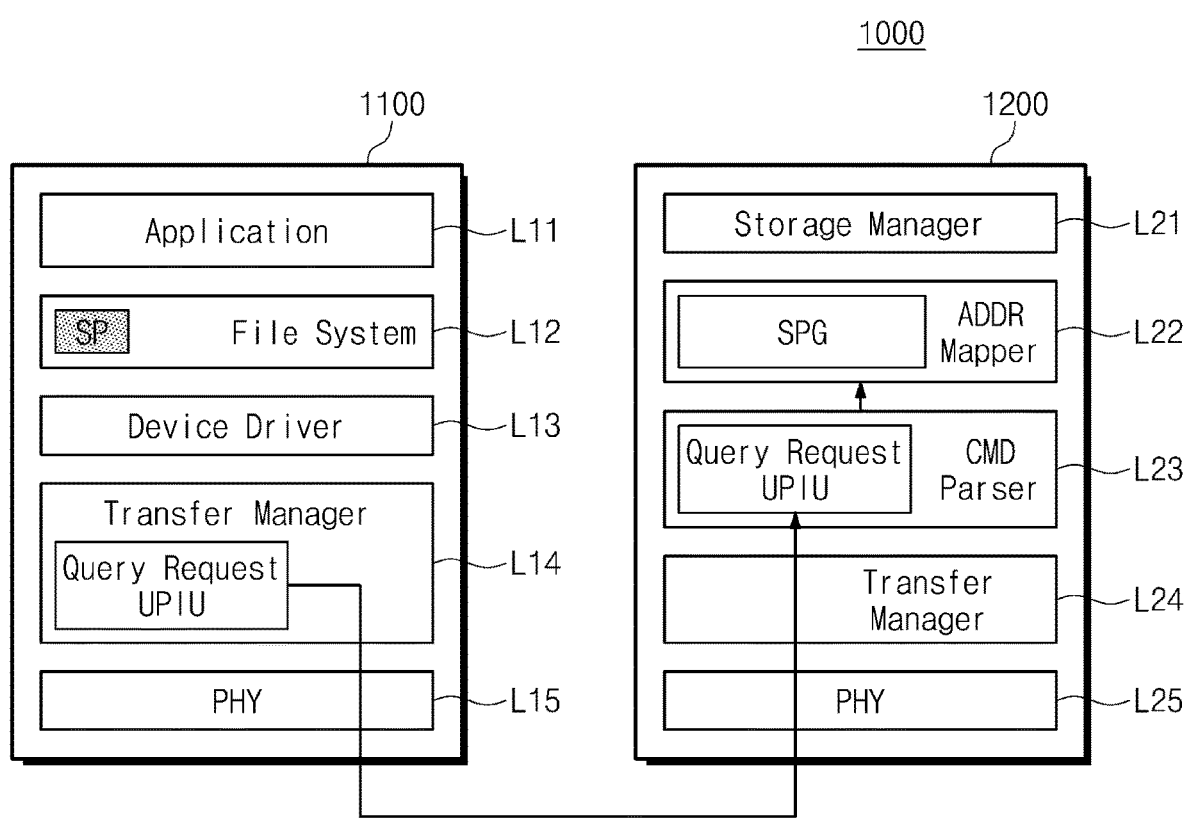
FIG. 11 is a block diagram hierarchically illustrating a process in which a selective purge operation is performed upon performing the selective purge operation, according to an embodiment of the present disclosure.

FIG. 11 is a block diagram hierarchically illustrating a process in which a selective purge operation is performed upon performing the selective purge operation, according to an embodiment of the present disclosure. For better understanding, a description of FIG. 11 will be given together with reference to features of FIG. 3.

The file system L12 of the host device 1100 may generate the selective purge tag SP associated with data, which belong to a selective purge group and are determined as needing to be erased physically and selectively, among invalid data of the storage device 1200. The transfer manager L14 may generate a query request Universal Flash Storage (UFS) protocol information unit (UPIU) under control of the device driver L13. The query request UPIU may include a request for a selective purge operation. That is, the query request UPIU described in the specification may be a selective purge request. The query request UPIU may be transferred to the storage device 1200 through the PHY layer L15 and PHY layer L25.

The command parser L23 may parse the query request UPIU to check that a request for the selective purge operation is received. The storage device 1200 may perform the purge operation on invalid data in response to the query request UPIU. However, since the query request UPIU includes the selective purge tag SP, only invalid data that correspond to a logical address and/or a physical address managed in the selective purge group SPG may be erased physically and selectively.

Figure 12:
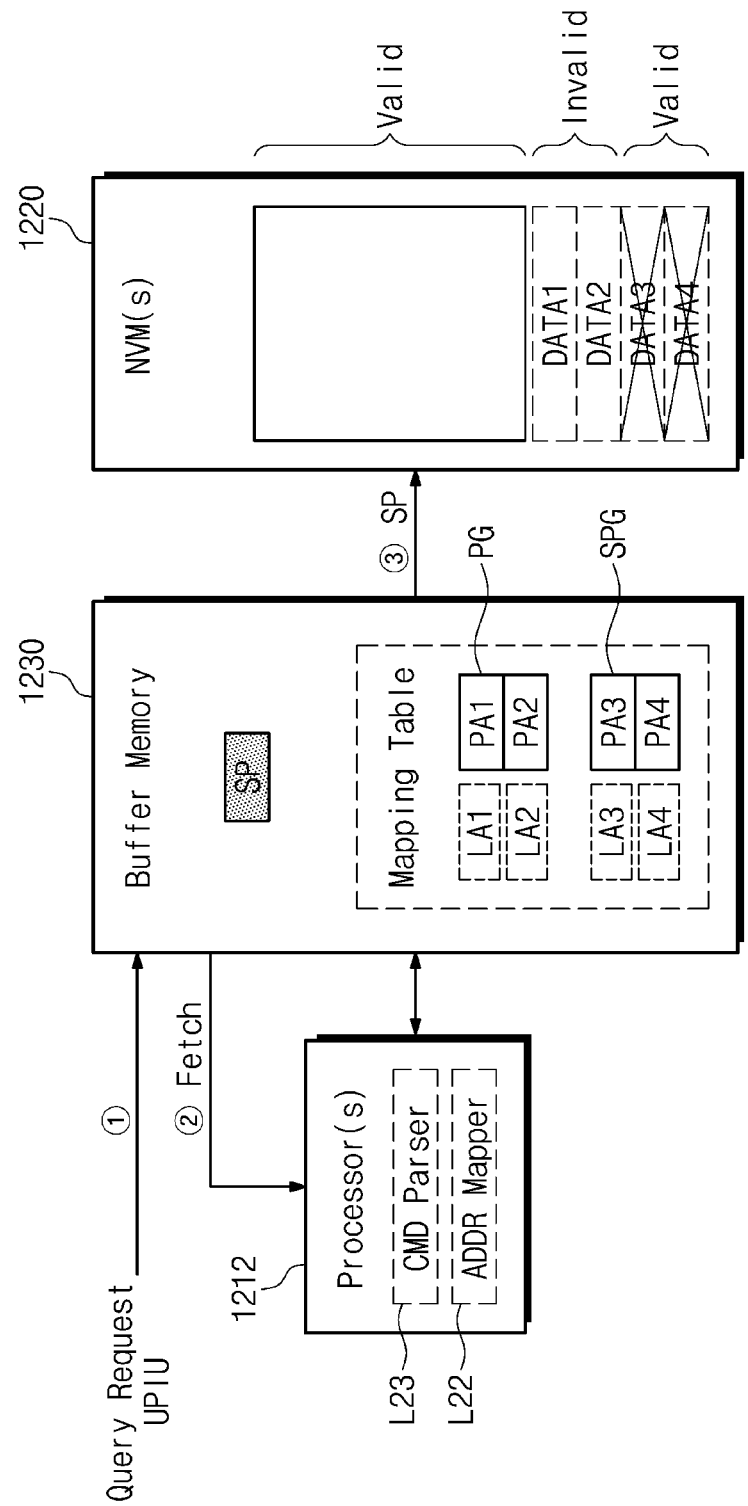
FIG. 12 is a block diagram illustrating a configuration of the storage device of the storage system illustrated in FIG. 10.

FIG. 12 is a block diagram illustrating a configuration of the storage device 1200 of the storage system 1000 illustrated in FIG. 10. Unlike FIG. 11 in which layers are hierarchically illustrated, FIG. 12 illustrates multiple blocks that are classified according to functions/operations of the storage device 1200. For better understanding, a description of FIG. 12 will be given together with reference to features of FIG. 10.

The query request UPIU received from the host device 1100 may be stored in the buffer memory 1230 (operation ①). The processor 1212 may fetch the query request UPIU stored in the buffer memory 1230 (operation ②). If the selective purge tag SP is checked as the processor 1212 directly parses the query request UPIU or the command parser L23 driven by the processor 1212 parses the query request UPIU, only pieces of invalid data belonging to the selective purge group may be erased physically.

FIGS. 13 and 14 are views illustrating a format of a packet that the host device 1100 outputs, according to an embodiment of the present disclosure. For example, a packet that the host device 1100 outputs may include the UPIU for (in compliance with) the interface protocol proposed by the JEDEC.

Referring to FIG. 13, the host device 1100 may output the query request UPIU. The query request UPIU may include multiple fields. Each field of the query request UPIU may be referenced by using a number marked in the drawing. Each field of the query command UPIU may include data of one byte.

A 0th field of the query request UPIU may include information about a transaction type. For example, a transaction code allocated to the query request UPIU may be "010110b".

A 1st field of the query request UPIU may include information about a flag. The 1st field of the query request UPIU may include a flag indicating that a data read operation is required from the host device 1100, a flag indicating that a data write operation is required from the host device 1100, and the like.

A 3rd field of the query request UPIU may include information about a task tag.

A 5th field of the query request UPIU may include information about a query function. The query function may be used to read or write descriptors, attributes, and flags in general.

An 8th field of the query request UPIU may include information about the overall length of an extra header segment (EHS).

In the query request UPIU, 10th and 11th fields may include information about the number of valid bytes of a data segment.

In the query request UPIU, 12th to 27th fields may include transaction specific fields.

An end-to-end CRC code of a header may be optionally added following the 27th field of the query request UPIU.

A k-th field to a (k+Lengh−1)-th field following the end-to-end CRC code may include a data segment area. The data segment area may be an optional area that depends on a value of a query function.

An end-to-end CRC code of data may be optionally added following the (k+Lengh−1)-th field of the query request UPIU.

FIG. 14 illustrates transaction specific fields of the query request UPIU of FIG. 13. For example, a transaction specific field may include a set flag associated with a selective purge request.

A 12th field of the query request UPIU may include information about an OP code OPCDE of a set flag. The OP code indicates an operation to be performed. For example, the OP code of the set flag may be "06h".

A 13th field of the query request UPIU may include a value to identify a particular flag for setting a storage device. For example, the case where a flag identification (Flag IDN) value is set to "1" may indicate that a purge operation is performed on a storage device.

A 14th field of the query request UPIU may include information associated with a selective purge operation. For example, the case where an index (INDEX) value is set to "0" may indicate that a normal purge operation is performed. That is, all invalid data stored in a storage device may be erased physically. In contrast, the case where an index (INDEX) value is set to "1" may indicate that a selective purge operation is performed. That is, only invalid data corresponding to a logical address and/or a physical address classified into the selective purge group may be erased physically.

A 15th field of the query request UPIU may not be considered and may be set to "0" as a default value.

Figure 15:
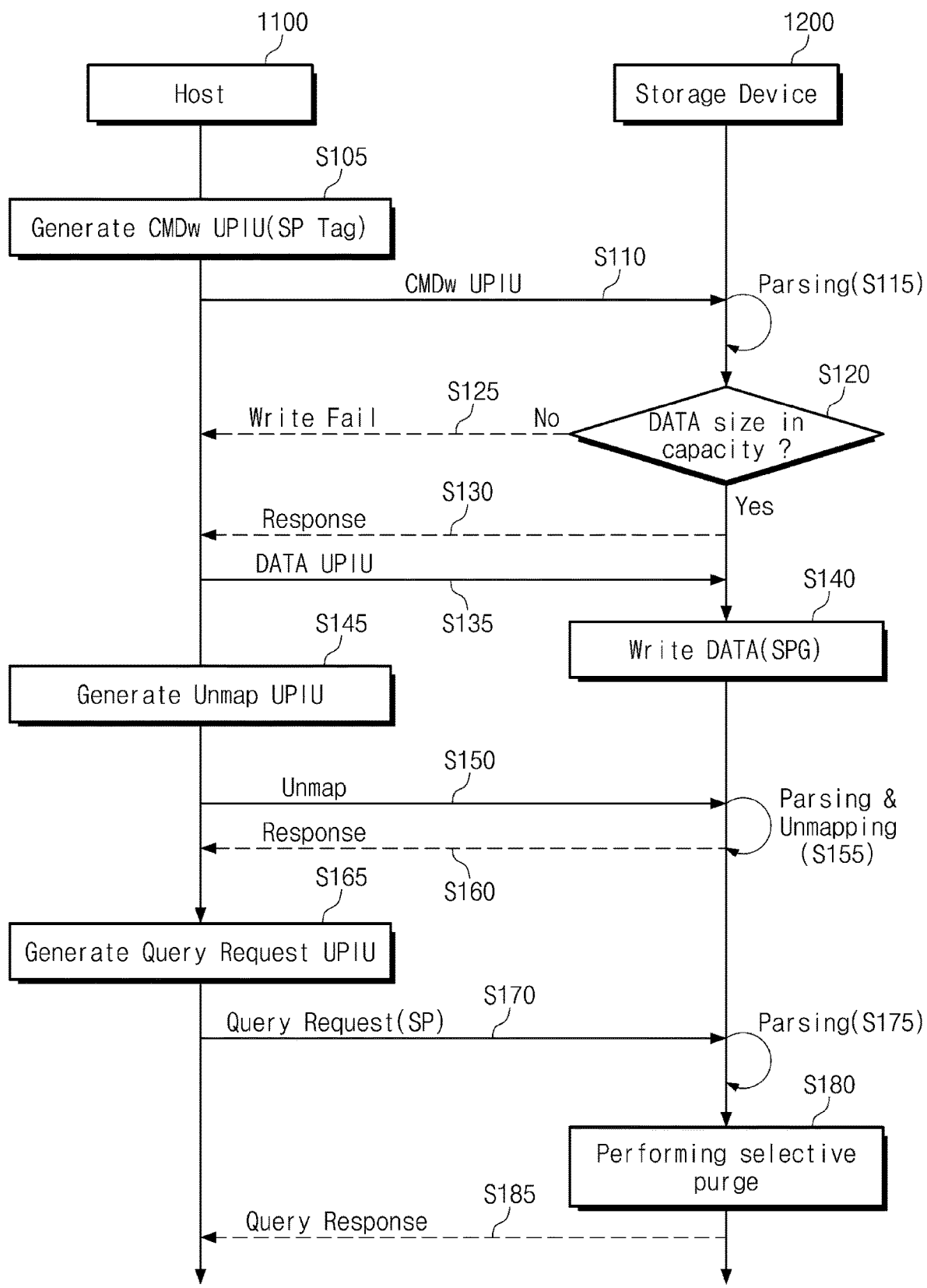
FIG. 15 is a flowchart for illustrating a selective purge operation performed in the storage system according to an embodiment of the present disclosure.

FIG. 15 is a flowchart for illustrating a selective purge operation performed in a storage system according to an embodiment of the present disclosure.

In operation S105, the write command UPIU CMDw UPIU including the selective purge tag SP may be generated. In the case where a file is generated by a write request from a user, a file system of the host device 1100 may determine whether the file needs a selective purge operation later and may generate the file based on the determination result. For example, in operation S110, the write command UPIU CMDw UPIU may be transferred to the storage device 1200.

In operation S115, the write command UPIU CMDw UPIU may be parsed. The storage device 1200 (in detail, the processor 1212 and/or the command parser L23 illustrated in FIG. 5) may check that the write command UPIU CMDw UPIU corresponds to a write request. The storage device 1200 may check a selective purge tag included in the write command UPIU CMDw UPIU to determine that data UPIU received following the write command UPIU CMDw UPIU include data to be managed in a selective purge group.

In operation S120, whether the size of data is within an allowable size may be determined on the basis of the result of parsing the write command UPIU CMDw UPIU. For example, the allowable size may be set on the basis of the size of a resource managed as the selective purge group. Whether to receive the data UPIU may be determined according to the determination result.

If the size of the received data exceeds the allowable size (No), the storage device 1200 may transfer a signal indicating write fail to the host device 1100. The host device 1100 that receives the write fail may again transfer the write command UPIU CMDw UPIU to the storage device 1200 or may generate another write command UPIU CMDw UPIU that does not include a selective purge tag.

In contrast, if the size of the received data is within the allowable size (Yes), the storage device 1200 may transfer a response to the host device 1100. For example, the response may be a packet including the UPIU. The host device 1100 that receives the response may transfer the data UPIU DATA UPIU to the storage device 1200.

In operation S140, data corresponding to a logical address managed in the selective purge group SPG may be stored in the storage device 1200. The address mapper L22 (refer to FIG. 5) driven by the processor 1212 (refer to FIG. 5) may separately manage a logical address managed in the selective purge group SPG.

In operation S145, the unmap UPIU may be generated according to a file delete request of the user. The unmap UPIU may include a command to logically erase data stored in the storage device 1200. In operation S150, the generated unmap UPIU may be transferred to the storage device 1200.

In operation S155, the unmap UPIU may be parsed. The storage device 1200 (in detail, the processor 1212 and/or the command parser L23 illustrated in FIG. 5) may check that the unmap UPIU corresponds to an erase request. The storage device 1200 (in detail, the processor 1212 and/or the command parser L23 illustrated in FIG. 5) may logically erase data stored in the storage device 1200 by releasing a correspondence relationship between a logical address included in the unmap UPIU and a physical address corresponding thereto. The logically erased data may be set to invalid data. In operation S160, a response indicating that a logical erase operation is completed may be transferred to the host device 1100.

Afterwards, in the case where there is a need to physically delete invalid data of the storage device 1200 due to, for example, insufficiency of a storage space or security reasons, the host device 1100 may generate the selective purge request (operation S165). For example, the host device 1100 may generate the query request UPIU based on the selective purge request. For example, the query request UPIU may include flag identification Flag IDN and index "INDEX" as described with reference to FIG. 14. In operation S170, the query request UPIU may be transferred to the storage device 1200.

In operation S175, the query request UPIU may be parsed. If the parsing result indicates that the selective purge request is received, the storage device 1200 may selectively and physically erase invalid data corresponding to a logical address and/or a physical address included in the selective purge group SPG separately managed. If the selective purge operation is completed, the storage device 1200 may transfer a response to the host device 1100.

According to the command UPIU and the data UPIU described above, whether write data are targeted for a selective purge operation may be set, determined or indicated from the operation of generating write data. After a write operation and an erase operation associated with data managed in the selective purge group, a purge operation may be performed only on data managed in the selective purge group, thereby preventing a decrease in speed of a storage system due to an unnecessary or excessive purge operation.

Figure 16:
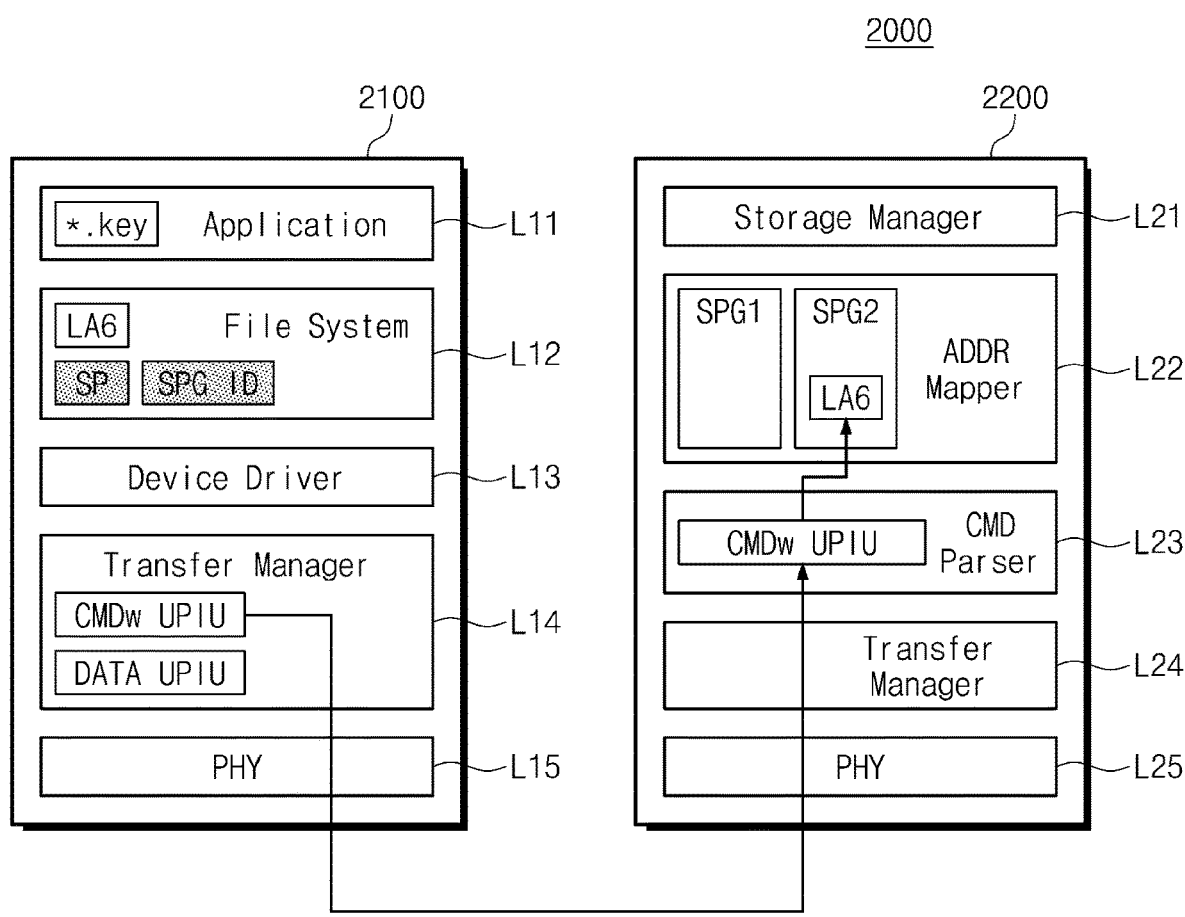
FIG. 16 is a block diagram hierarchically illustrating a process in which a file is generated upon performing a selective purge operation, according to another embodiment of the present disclosure.

FIG. 16 is a block diagram hierarchically illustrating a process in which a file is generated upon performing a selective purge operation, according to another embodiment of the present disclosure. A storage system 2000 may include a host device 2100 and a storage device 2200. Unlike the above embodiments, in the embodiment of FIG. 16, multiple selective purge groups are generated. For better understanding, a description of FIG. 16 will be given together with reference to features of FIG. 3, and contents overlapped with those of the above embodiments will not be repeated here.

A key file, a logical address LA6 corresponding to the key file, a selective purge tag SP, and a selective purge group identifier SPG ID may be generated according to a request of a user. The selective purge group identifier SPG ID may indicate a group, to which a write-requested key file belongs among multiple selective purge groups. In this embodiment, the logical address LA6 corresponding to the key file may belong to a second selective purge group SPG2.

Alternatively, the selective purge group identifier SPG ID may indicate any one group of the multiple selective purge groups, which is managed according to a file format or extension. In this case, a file having the same extension or format may be managed as belonging to the same selective purge group. For example, the second selective purge group SPG2 may manage a logical address and/or a physical address corresponding to a file having extension "key".

Alternatively, the selective purge group identifier SPG ID may include unique information such as inode. In this case, files belonging to the same directory may be managed as belonging to the same selective purge group. For example, the second selective purge group SPG2 may include both a folder in which a key file is stored and a subfolder of the folder in which the key file is stored.

However, classification that depends on the above-described file extension or inode may be exemplary, and files may be classified into selective purge groups based on various criteria corresponding to various factors, such as a request of a user, a type of an application, attributes, and the like.

Figure 17:
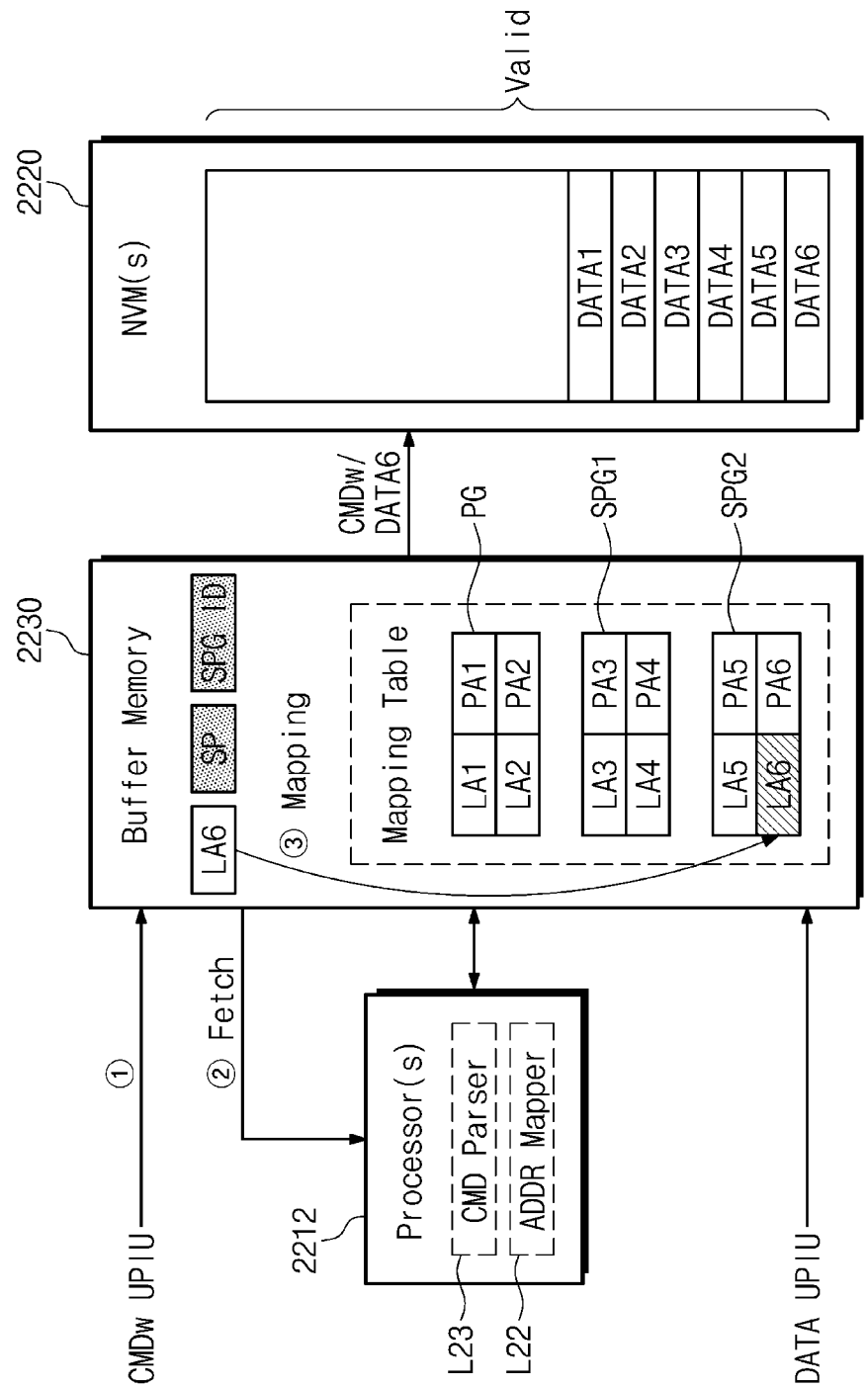
FIG. 17 is a block diagram illustrating a configuration of the storage device of the storage system illustrated in FIG. 16.

FIG. 17 is a block diagram illustrating a configuration of the storage device 2200 of the storage system 2000 illustrated in FIG. 16. Unlike FIG. 16 in which layers are hierarchically illustrated, FIG. 17 illustrates multiple blocks that are classified according to functions/operations of the storage device 2200. To help understand, a description of FIG. 17 will be given together with reference to features of FIG. 16.

FIG. 17 illustrates that logical addresses LA1 and LA2 and/or physical addresses PA1 and PA2 corresponding thereto are managed in the purge group PG, that logical addresses LA3 and LA4 and/or physical addresses PA3 and PA4 corresponding thereto are managed in a first selective purge group SPG1, and that a logical address LA5 and/or a physical address PA5 corresponding thereto are managed in a second selective purge group SPG2. In addition, pieces of data DATA1, DATA2, DATA3, DATA4, and DATA5 may be indicated by the physical addresses PA1, PA2, PA3, PA4, and PA5, respectively.

The write command UPIU CMDw UPIU received from the host device 2100 may be stored in the buffer memory 2230 (operation ①). The processor 2212 may fetch the write command UPIU CMDw UPIU stored in the buffer memory 2230 (operation ②). As the processor 2212 or the command parser L23 parses the write command UPIU CMDw UPIU, the received command may be recognized as a command corresponding to a write request. In addition, it may be possible to check that data UPIU DATA UPIU to be next received are targeted for selective purge. It may also be possible to check a selective purge group to which the data UPIU belongs, from the ID SPG ID of the selective purge group and the selective purge tag SP.

The address mapper L22 driven by the processor 2212 may translate a logical address LA6 to a physical address PA6. In addition, the address mapper L22 may manage the logical address LA6 and/or the physical address PA6 in the second selective purge group SPG2 (operation ③). The purge group PG and the selective purge group SPG1 and selective purge group SPG2 are illustrated as being separately managed. However, the selective purge group SPG1 and selective purge group SPG2 may be managed as a part of the purge group PG.

The embodiment described with reference to FIGS. 16 and 17 is similar to the embodiments described with reference to FIGS. 4 to 15 except that multiple selective purge groups are managed. Therefore, drawings similar to FIGS. 9 and 10 illustrated to describe an erase operation and drawings similar to FIGS. 11 and 12 illustrated to describe a purge operation are not separately provided. Below, an erase operation and a selective purge operation will be briefly described with reference to FIGS. 16 and 17.

First, if an unmap UPIU to delete data corresponding to logical addresses LA1, LA2, LA3, LA4, LA5, and LA6 is received from the host device 2100, the address mapper L22 may unmap the logical addresses LA1, LA2, LA3, LA4, LA5, and LA6. Therefore, the pieces of data DATA1, DATA2, DATA5, DATA4, DATA5, and DATA6 may be set to invalid data. Afterwards, if the query request UPIU is received from the host device 2100, the processor 2212 or the command parser L23 may parse the query request UPIU. If an ID of a selective purge group indicates the second selective purge group SPG2, only the pieces of data DATA5 and DATA6 corresponding to the second selective purge group SPG2 may be erased physically.

Afterwards, the pieces of data DATA3 and DATA4 corresponding to the first selective purge group SPG1 may also be erased physically according to a request of the host device 2100 or when a storage space of the storage device 2200 is insufficient. After then, the pieces of data DATA1 and DATA2 corresponding to a normal purge group PG may be erased physically.

FIGS. 18 and 19 are views illustrating a format of a packet that the host device 2100 outputs, according to an embodiment of the present disclosure. For example, a packet that the host device 2100 outputs may include the UPIU for (in compliance with) the interface protocol proposed by the JEDEC. The UPIU illustrated in FIGS. 18 and 19 is similar to those described with reference to FIGS. 8 and 14. Below, a difference may be mainly described.

Referring to FIG. 18, a write command descriptor block may further include a selective purge tag SP and a selective purge group ID SPG ID in addition to normal fields.

The selective purge tag SP may include information about whether write data to be transferred to the storage device 2200 are targeted for a selective purge operation. For example, in the case where a value of the selective purge tag SP is set to "0", write data to be stored in the storage device 2200 may be targeted for a normal purge operation. That is, all invalid data of the storage device 2200 may be erased physically upon performing the purge operation.

In contrast, in the case where a value of the selective purge tag SP is set to "1", write data transferred together with the command UPIU may be managed in a separate selective purge group. Afterwards, write data may be logically deleted (i.e. or e.g., unmapped) according to an erase request from the host device 2100. In the case where there is a need to erase write data physically because of, for example, insufficiency of storage space or security reasons, data managed in the selective purge group may be physically erased according to a selective purge request from the host device 2100.

A selective purge group identifier SPG ID may indicate a group to which write data targeted for a selective purge operation belong. Alternatively, the selective purge group identifier SPG ID may indicate any one group of multiple selective purge groups, which is managed according to a file format or extension. Alternatively, the selective purge group identifier SPG ID may include unique information such as inode. However, the above classification may be exemplary, and files may be classified into selective purge groups based on various criteria corresponding to various factors, such as a request of a user, a type of an application, attributes, and the like.

Referring to FIG. 19, the query request UPIU may include multiple fields. Each field of the query request UPIU may be referenced by using a number marked in the drawing. Each field of the query command UPIU may include data of one byte.

A 13th field of the query request UPIU may include a value to identify a particular flag for setting a storage device. For example, a flag identification value Flag IDN set to "1" may indicate that a purge operation is performed on a storage device.

A 14th field of the query request UPIU may include information associated with a selective purge operation. For example, an index "INDEX" set to "0" may indicate that a normal purge operation is performed, and an index "INDEX" set to "1" may indicate that a selective purge operation is performed.

A 16th field of the query request UPIU may include an ID SPG ID of a selective purge group where an erase operation is performed selectively and physically. For example, the selective purge group ID SPG ID may include various information such as a group number, information about extension of a file to be erased physically, inode, and the like.

Figure 20:
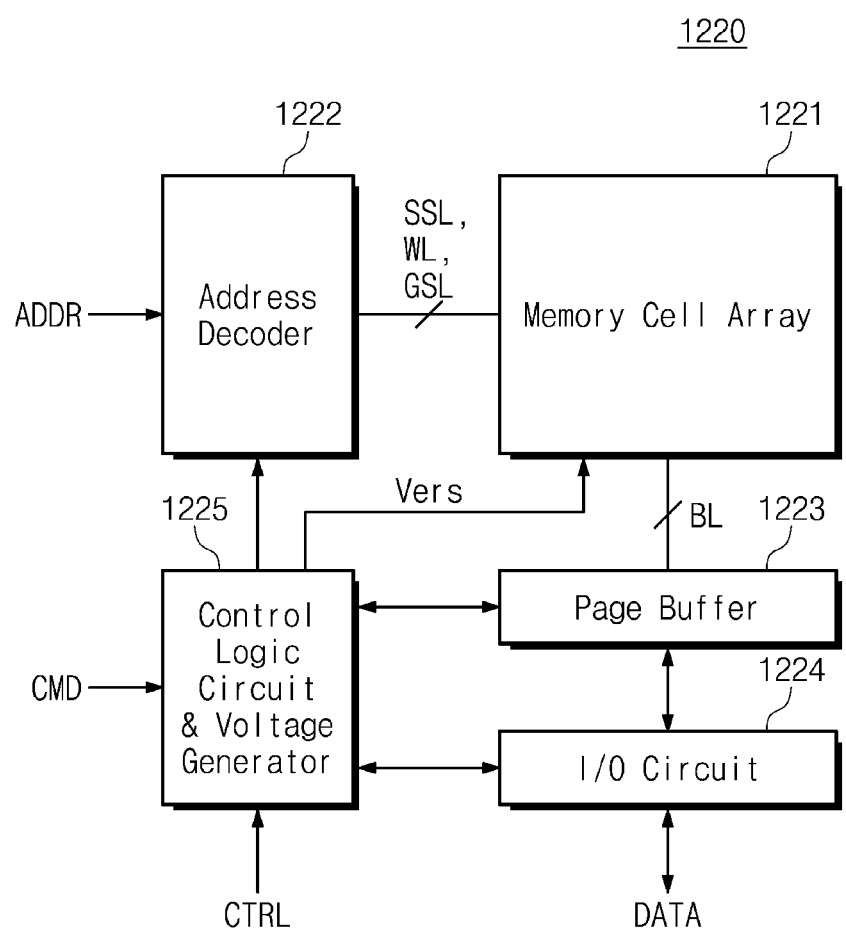
FIG. 20 is a block diagram illustrating any one of the nonvolatile memory devices illustrated in FIG. 1.

FIG. 20 is a block diagram illustrating any one of the nonvolatile memory devices 1220 illustrated initially in FIG. 1. Referring to FIG. 20, the nonvolatile memory device 1220 may include a memory cell array 1221, an address decoder 1222, a page buffer 1223, an input/output circuit 1224, and a control logic and voltage generator circuit 1225.

The memory cell array 1221 may include multiple memory blocks. Each of the memory blocks may include multiple cell strings. Each of the cell strings may include multiple memory cells. The memory cells may be connected with multiple word lines WL. Each memory cell may be a single level cell (SLC) storing one bit or a multi-level cell (MLC) storing at least two bits.

The address decoder 1222 may be connected with the memory cell array 1221 through the word lines WL, string selection lines SSL, and ground selection lines GSL. The address decoder 1222 may receive a logical address from the outside and may decode the received logical address to drive the word lines WL. For example, an address ADD may be a physical address of the nonvolatile memory device 1220 converted from the logical address. The above-described address conversion operation may be performed by a flash translation layer FTL driven by a controller (e.g., 1210 of FIG. 1) according to an aspect of the present disclosure.

The page buffer 1223 is connected to the memory cell array 1221 through multiple bit lines BL. Under control of the control logic and voltage generating circuit 1225, the page buffer 1223 may control the bit lines BL such that data "DADA" provided from the input/output circuit 1224 are stored in the memory cell array 1221. Under control of the control logic and voltage generating circuit 1225, the page buffer 1223 may read data stored in the memory cell array 1221 and may provide the read data to the input/output circuit 1224. In an embodiment, the page buffer 1223 may receive data from the input/output circuit 1224 in units of pages or may read data from the memory cell array 1221 in units of pages.

The input/output circuit 1224 may receive data from an external device and may provide the received data to the page buffer 1223.

The control logic and voltage generator circuit 1225 may control the address decoder 1222, the page buffer 1223, and the input/output circuit 1224 in response to a command CMD and a control signal CTRL from the outside. For example, the control logic and voltage generating circuit 1225 may control other components in response to the signals CMD and CTRL such that data are stored in the memory cell array 1221. Alternatively, the control logic and voltage generating circuit 1225 may control other components in response to the signals CMD and CTRL such that data stored in the memory cell array 1221 are transferred to the external device. The control signal CTRL may be a signal that the controller 1210 provides to control the nonvolatile memory device 1220.

The control logic and voltage generating circuit 1225 may generate various voltages required for the nonvolatile memory device 1220 to operate. For example, the control logic and voltage generating circuit 1225 may generate multiple program voltages, multiple pass voltages, multiple verification voltages, multiple selection read voltages, multiple non-selection read voltages, multiple erase voltages, and the like. The control logic and voltage generating circuit 1225 may provide the generated voltages to the address decoder 1222 or to a substrate of the memory cell array 1221.

Figure 21:
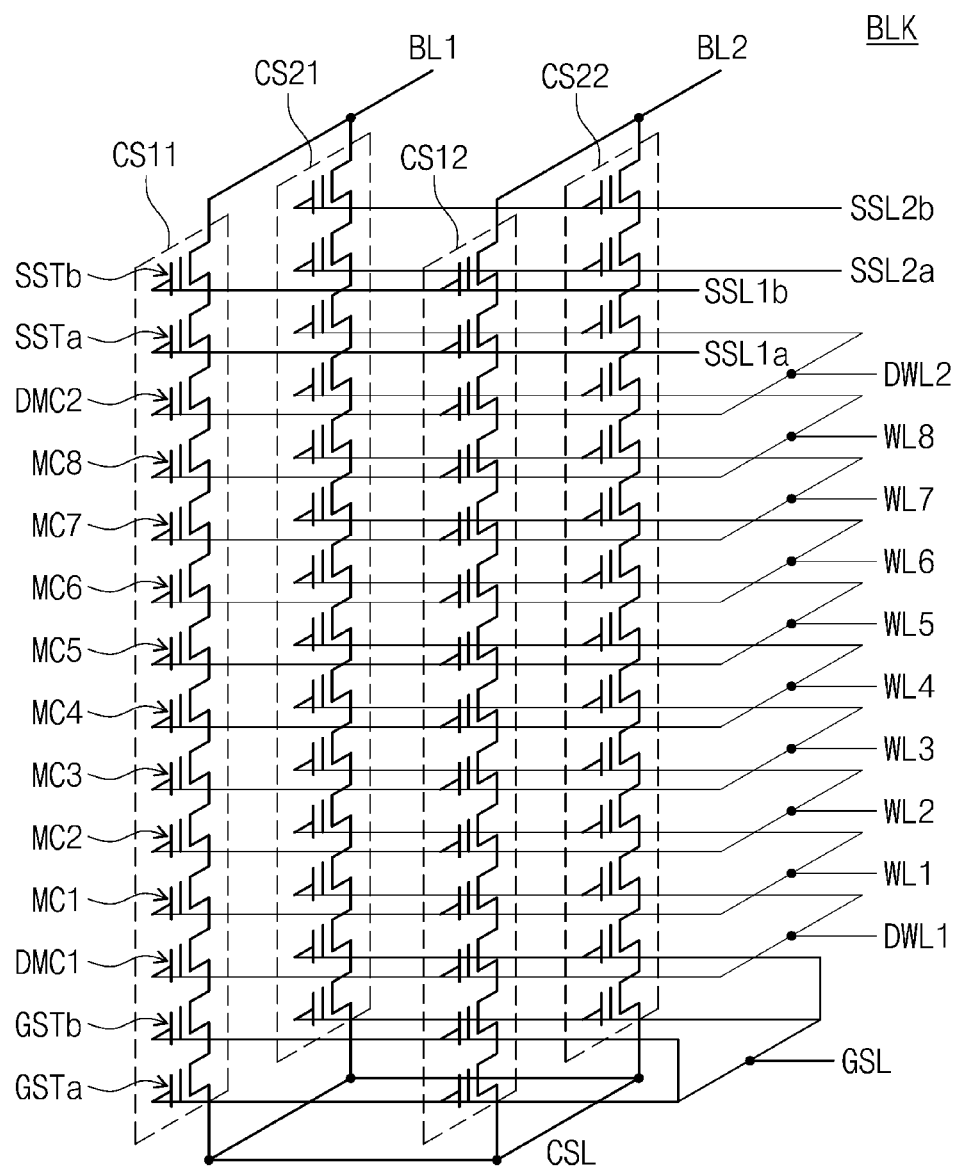
FIG. 21 is a circuit diagram illustrating one of memory blocks included in a cell array of a memory cell array of FIG. 20.

FIG. 21 is a circuit diagram illustrating one of memory blocks included in a cell array of a memory cell array of FIG. 20. In an embodiment, a memory block BLK of a three-dimensional structure will be described with reference to FIG. 21.

Referring to FIG. 21, the memory block BLK may include multiple cell strings CS11, CS12, CS21, and CS22. The cell strings CS11, CS12, CS21, and CS22 may be arranged along a row direction and a column direction to form rows and columns.

For example, the cell strings CS11 and CS12 may be connected to string selection lines SSL1a and SSL1b to constitute a first row. The cell strings CS21 and CS22 may be connected to string selection lines SSL2a and SSL2b to constitute a second row. For example, the cell strings CS11 and CS21 may be connected to a first bit line BL1 to constitute a first column. The cell strings CS12 and CS22 may be connected to a second bit line BL2 to constitute a second column.

Each of the cell strings CS11, CS12, CS21, and CS22 may include multiple cell transistors. Each of the cell strings CS11, CS12, CS21, and CS22 may include string selection transistors SSTa and SSTb, multiple memory cells MC1 to MC8, ground selection transistors GSTa and GSTb, and dummy memory cells DMC1 and DMC2. In an embodiment, each of the memory cells included in the cell strings CS11, CS12, CS21, and CS22 may be a charge trap flash (CTF) memory cell.

The memory cells MC1 to MC8 may be serially connected and may be stacked in a height direction being a direction perpendicular to a plane defined by the row direction and the column direction. In each cell string, the string selection transistors SSTa and SSTb may be serially connected and may be arranged between the memory cells MC1 to MC8 and a bit line BL1 or BL2. In each cell string, the ground selection transistors GSTa and GSTb may be serially connected and may be arranged between the memory cells MC1 to MC8 and a common source line CSL.

In an embodiment, in each cell string, a first dummy memory cell DMC1 may be arranged between the memory cells MC1 to MC8 and the ground selection transistors GSTa and GSTb. In an embodiment, in each cell string, a second dummy memory cell DMC2 may be arranged between the memory cells MC1 to MC8 and the string selection transistors SSTa and SSTb.

The ground selection transistors GSTa and GSTb of the cell strings CS11, CS12, CS21, and CS22 may be connected in common to a ground selection line GSL. In an embodiment, ground selection transistors in the same row may be connected to the same ground selection line. Ground selection transistors in different rows may be connected to another ground selection line. For example, the first ground selection transistors GSTa of the cell strings CS11 and CS12 in the first row may be connected to a first ground selection line. The first ground selection transistors GSTa of the cell strings CS21 and CS22 in the second row may be connected to a second ground selection line.

In an embodiment, even though not illustrated in FIG. 21, ground selection transistors provided at the same height from a substrate (not illustrated) may be connected to the same ground selection line. Ground selection transistors provided at different heights may be connected to different ground selection lines. For example, in the cell strings CS11, CS12, CS21, and CS22, the first ground selection transistors GSTa may be connected to the first ground selection line. The second ground selection transistors GSTb may be connected to the second ground selection line.

Memory cells arranged at the same height from the substrate (or the ground selection transistors GSTa and GSTb) may be connected in common to the same word line. Memory cells arranged at different heights therefrom may be connected to different word lines. For example, memory cells MC1 to MC8 of the cell strings CS11, CS12, CS21, and CS22 may be connected to first to eighth word lines WL1 to WL8.

String selection transistors, which belong to the same row among the first string selection transistors SSTa arranged at the same height, may be connected to the same string selection line. String selection transistors, which belong to different rows among the first string selection transistors SSTa, may be connected to different string selection lines. For example, the first string selection transistors SSTa of the cell strings CS11 and CS12 in the first row may be connected in common to the string selection line SSL1a, and the first string selection transistors SSTa of the cell strings CS21 and CS22 in the second row may be connected in common to the string selection line SSL1a.

String selection transistors, which belong to the same row among the second string selection transistors SSTb arranged at the same height, may be connected to the same string selection line. String selection transistors, which belong to different rows among the second string selection transistors SSTb, may be connected to different string selection lines. For example, the second string selection transistors SSTb of the cell strings CS11 and CS12 in the first row may be connected in common to the string selection line SSL1b, and the second string selection transistors SSTb of the cell strings CS21 and CS22 in the second row may be connected in common to the string selection line SSL2b.

Even though not illustrated, string selection transistors of cell strings in the same row may be connected in common to the same string selection line. For example, the first and second string selection transistors SSTa and SSTb of the cell strings CS11 and CS12 in the first row may be connected in common to the same string selection line. The first and second string selection transistors SSTa and SSTb of the cell strings CS21 and CS22 in the second row may be connected in common to the same string selection line.

In an embodiment, dummy memory cells at the same height may be connected with the same dummy word line. Dummy memory cells at different heights may be connected with different dummy word lines. For example, the first dummy memory cells DMC1 may be connected to a first dummy word line DWL1, and the second dummy memory cells DMC2 may be connected to a second dummy word line DWL2.

In the memory block BLK, read and write operations may be performed in units of rows. For example, a row of the first memory block BLK may be selected by the string selection lines SSL1a, SSL1b, SSL2a, and SSL2b.

For example, the cell strings CS11 and CS12 in the first row may be respectively connected to the bit lines BL1 and BL2 when a turn-on voltage is supplied to the string selection lines SSL1a and SSL1b and a turn-off voltage is supplied to the string selection lines SSL2a and SSL2b. The cell strings CS21 and CS22 in the second row may be respectively connected to the bit lines BL1 and BL2 when the turn-on voltage is supplied to the string selection lines SSL2a and SSL2b and the turn-off voltage is supplied to the string selection lines SSL1a and SSL1b. Memory cells, which are arranged at the same height among memory cells in cell strings connected to the driven word line, may be selected by driving a word line. Read and write operations may be performed with respect to the selected memory cells. The selected memory cells may constitute a physical page unit.

In the first memory block BLK1, memory cells may be erased in units of a memory block or a sub-block. When an erase operation is performed in units of memory blocks, all memory cells MC in the memory block BLK1 may be simultaneously erased according to an erase request. When the erase operation is performed in units of sub-blocks, some of memory cells MC in the memory block BLK1 may be simultaneously erased according to an erase request while the remaining memory cells thereof may be erase-inhibited. A low voltage (e.g., a ground voltage) may be supplied to a word line connected to erased memory cells, and a word line connected to erase-inhibited memory cells MC may be floated.

In an embodiment, the memory block BLK illustrated in FIG. 21 is only an example. The number of cell strings may increase or decrease, and the number of rows of cell strings and the number of columns of cell strings may increase or decrease according to the number of cell strings. In the memory block BLK, the number of cell transistors (GST, MC, DMC, SST, etc.) may increase or decrease, and a height of the memory block BLK may increase or decrease according to the number of cell transistors (GST, MC, DMC, SST, etc.). Also, the number of lines (GSL, WL, DWL, SSL, etc.) connected with transistors may increase or decrease depending on the number of the transistors.

According to an embodiment of the present disclosure, all invalid data stored in a storage device may not be erased physically. For example, write data transferred to the storage device may be managed in a selective purge group upon performing a write operation, and only invalid data managed in the selective purge group may be erased physically upon performing a selective purge operation. Therefore, a speed of a purge operation may be improved.

While the inventive concepts described herein have been described with reference to exemplary embodiments thereof, it will be apparent to those of ordinary skill in the art that various changes and modifications may be made thereto without departing from the spirit and scope of the present disclosure as set forth in the following claims.

What is claimed is:

1. A storage system, comprising:
a host device configured to generate a write command, a logical address of write data corresponding to the write command, and a selective purge tag indicating that the write data are targeted for physical erasing in response to a selective purge request; and
a storage device configured to receive the write command, the logical address, and a plurality of selective purge tags, including the selective purge tag, to store the write data, and to logically erase the stored write data upon receiving an erase command from the host device,
wherein the storage device is further configured to physically erase the stored write data which is indicated by the selective purge tag, from among all logically erased write data, upon receiving the selective purge request from the host device,
wherein, upon receiving the selective purge request from the host device, the storage device does not physically erase other logically erased write data which is not indicated by any of the plurality of selective purge tags, including the selective purge tag, received by the storage device.

2. The storage system of claim 1, wherein the host device is further configured to generate:
a first packet that is based on the write command, the logical address, and the selective purge tag and includes a command Universal Flash Storage (UFS) protocol information unit (UPIU); and
a second packet that is based on the selective purge request and includes a data UPIU.

3. The storage system of claim 2, wherein the selective purge tag is included in at least one field of 16th to 31st fields of the command Universal Flash Storage (UFS) protocol information unit (UPIU).

4. The storage system of claim 2, wherein information associated with the selective purge request is included in a 14th field of a query request UPIU.

5. The storage system of claim 1, wherein the storage device manages the logical address in a selective purge group, and
wherein a size of the selective purge group is set in consideration of a resource of the storage device.

6. The storage system of claim 5, wherein, if a size of the write data exceeds the size of the selective purge group, the storage device processes the write command as fail.

7. The storage system of claim 1, wherein the storage device is further configured to:
generate an identifier (ID) of a selective purge group, to which the logical address or the write data belong, from among a plurality of selective purge groups managed by the storage device.

8. The storage system of claim 7, wherein the host device is further configured to generate:
a first packet that is based on the write command, the logical address, the selective purge tag, and the ID and includes an Universal Flash Storage (UFS) protocol information unit (UPIU); and
a second packet that is based on the selective purge request and the ID and includes an UPIU.

9. The storage system of claim 8, wherein the selective purge tag and the ID are included in at least one field of 16th to 31st fields of a command UPIU.

10. The storage system of claim 8, wherein information associated with the selective purge request is included in a 14th field of a query request UPIU, and
wherein the ID is included in a 16th field of the query request UPIU.

11. A method of operating a storage system, the method comprising:
receiving a plurality of first packets which are each respectively based on a write command, a logical address of write data corresponding to the write command, and a selective purge tag indicating that the write data are targeted for physical erasing in response to a selective purge request, wherein the first packets are generated by a host device;
receiving a plurality of second packets which are respectively based on the write data indicated by selective purge tags of corresponding first packets, wherein the second packets are generated by the host device;
parsing a first packet of the first packets to manage the logical address in a selective purge group;
storing the write data from one of the plurality of second packets and which is indicted by the selective purge tag of the first packet;
logically erasing the stored write data from a storage device based on an erase command received from the host device; and physically erasing the stored write data which is indicated by the selective purge tag of the first packet, from among all logically erased write data from the storage device, based on a third packet corresponding to the selective purge request from the host device, wherein other logically erased write data which is stored by the storage device and which is not indicated by any received selective purge tag, including the selective purge tag of the first packet, is not physically erased when physically erasing the stored write data.

12. The method of claim 11, wherein the second packet is not received if a result of the parsing of the first packet indicates that a size of the write data exceeds a size of the selective purge group.

13. The method of claim 11, wherein the selective purge tag is included in at least one field of 16th to 31st of a command Universal Flash Storage (UFS) protocol information unit (UPIU).

14. The method of claim 11, wherein information associated with the selective purge request is included in a 14th field of a query request Universal Flash Storage (UFS) protocol information unit (UPIU).

15. The method of claim 11, wherein each of the first packet and the third packet further includes an ID of a selective purge group, to which the logical address or the write data belong, from among a plurality of selective purge groups managed by the storage device.

16. The method of claim 15, wherein the selective purge tag and the ID are included in at least one field of 16th to 31st fields of a command Universal Flash Storage (UFS) protocol information unit (UPIU).

17. The method of claim 15, wherein information associated with the selective purge request is included in a 14th field of a query request Universal Flash Storage (UFS) protocol information unit (UPIU), and
wherein the ID is included in a 16th field of the query request Universal Flash Storage (UFS) protocol information unit (UPIU).

18. A storage system, comprising:
a host device configured to generate a command Universal Flash Storage (UFS) protocol information unit (UPIU) including a write command and a selective purge tag indicating that write data corresponding to the write command are targeted for physical erasing in response to a selective purge request, and data UPIU including the write data; and
a storage device configured to receive the command UPIU and the data UPIU, to manage the write data as a selective purge group, and to logically erase the write data upon receiving an unmap UPIU from the host device, wherein the host device is further configured to:
generate a query request UPIU including the selective purge request indicating that the write data are targeted for physically erasing the write data belonging to the selective purge group, and wherein the storage device is further configured to:
receive the query request UPIU; and
physically erase the write data belonging to the selective purge group which is indicated by the selective purge tag, from among all logically erased write data, based on the selective purge request included in the query request UPIU, wherein the host device is configured to generate a plurality of command UPIUs including the command UPIU, and a plurality of data UPIUs including the data UPIU, the storage device is configured to receive the plurality of command UPIUs and the plurality of data UPIUs, the plurality of command UPIUs includes a corresponding plurality of selective purge tags including the selective purge tag, and wherein, upon receiving the selective purge request from the host device, the storage device does not physically erase other logically erased write data which is not indicated by any of the selective purge tags, including the selective purge tag, received by the storage device.

19. The storage system of claim 18, wherein the selective purge tag is included in at least one field of 16th to 31st fields of the command UPIU.

20. The storage system of claim 18, wherein information associated with the selective purge request is included in a 14th field of the query request UPIU.

* * * * *